United States Patent
Kikuchi et al.

(10) Patent No.: US 11,307,549 B2
(45) Date of Patent: Apr. 19, 2022

(54) DISTRIBUTED CONTROL SYSTEM

(71) Applicants: Toyota Jidosha Kabushiki Kaisha, Toyota (JP); Toyota School Foundation, Nagoya (JP)

(72) Inventors: Satoshi Kikuchi, Susono (JP); Michihiro Kawanishi, Nagoya (JP); Tatsuo Narikiyo, Nagoya (JP); Ngoc Huynh Tran, Nagoya (JP)

(73) Assignees: TOYOTA JIDOSHA KABUSHIKI KAISHA, Toyota (JP); Toyota School Foundation, Nagoya (JP)

(*) Notice: Subject to any disclaimer, the term of this patent is extended or adjusted under 35 U.S.C. 154(b) by 11 days.

(21) Appl. No.: 16/909,240

(22) Filed: Jun. 23, 2020

(65) Prior Publication Data

US 2020/0409327 A1     Dec. 31, 2020

(30) Foreign Application Priority Data

Jun. 26, 2019    (JP) .............................. JP2019-119171

(51) Int. Cl.
    *G05B 19/042*        (2006.01)
    *G05B 19/045*        (2006.01)

(52) U.S. Cl.
    CPC ....... *G05B 19/0425* (2013.01); *G05B 19/045* (2013.01); *G05B 2219/1204* (2013.01)

(58) Field of Classification Search
    CPC .............. G05B 19/0425; G05B 19/045; G05B 2219/1204; G05B 19/41885; G05B 2219/32339
See application file for complete search history.

(56) References Cited

U.S. PATENT DOCUMENTS

| | | | | |
|---|---|---|---|---|
| 2011/0187106 A1* | 8/2011 | Ichinose | ................. | F03D 7/048 290/44 |
| 2014/0110941 A1* | 4/2014 | Kjær | ...................... | F03D 7/048 290/44 |

FOREIGN PATENT DOCUMENTS

| | | |
|---|---|---|
| JP | 2009-159808 A | 7/2009 |
| JP | 2010-146246 A | 7/2010 |
| JP | 2016-099955 A | 5/2016 |

OTHER PUBLICATIONS

Alberto Petrillo, Adaptive multi-agents synchronization for collaborative driving of autonomous vehicles with multiple communication delays, Dec. 22, 2017, Elsevier, Transportation Research Part C 86 (2018) 372-392 (Year: 2017).*

(Continued)

*Primary Examiner* — Rocio Del Mar Perez-Velez
*Assistant Examiner* — Christopher W Carter
(74) *Attorney, Agent, or Firm* — Dinsmore & Shohl LLP

(57) ABSTRACT

A system includes a plurality of control devices that respectively control the states of a plurality of apparatuses and are connected to each other via communication lines. When each of the control devices determines a state target value of its own apparatus using the current state indicator value of the own apparatus, and the distributed controller input which is a function of the state indicator value of an apparatus adjacent to the own apparatus and the state indicator value of the own apparatus, the control gain which adjusts contribution of the distributed controller input to the state target value is determined based on a communication delay time between the control devices.

4 Claims, 7 Drawing Sheets

(56) References Cited

OTHER PUBLICATIONS

Alberto Petrillo, Adaptive synchronization of linear multi-agent systems with time-varying multiple delays, Oct. 24, 2017, Elsevier, Journal of the Franklin Institute 354 (2017) 8586-8605 (Year: 2017).*

Azuma, et al., "Control of Multi-agent System", System Control Engineering Series 22, Corona Publishing Co., Ltd. p. 80-111, Sep. 18, 2015. (The concise explanation of relevance is contained in the specification at p. 3).

Sakurama, et al, "Average-consensus Problem of Multi-agent Systems with Non-uniform and Asymmetric Time-delays", Transactions of the Society of Instrument and Control Engineers, vol. 47, No. 2, p. 100-109, 2011. (The concise explanation of relevance is contained in the specification at p. 3).

Wu, et al., "Average Consensus in Multi-Agent Systems with Non-uniform Time-Varying Delays and Random Packet Losses", 3rd IFAC International Conference on Intelligent Control and Automation Science. Sep. 2-4, 2013, Chengdu, China. p. 321-326. (Cited in the specification at p. 3).

\* cited by examiner

DISTRIBUTED CONTROL SYSTEM

CROSS-REFERENCE TO RELATED APPLICATION

This application claims priority to Japanese Patent Application No. 2019-119171 filed on Jun. 26, 2019, incorporated herein by reference in its entirety.

BACKGROUND

1. Technical Field

The present disclosure relates to a distributed control system in which each of control devices for a plurality of apparatuses is connected to each other via a network and controls the state of its own apparatus based on the state of its own apparatus and the state of other apparatuses. More specifically, the present disclosure relates to a system in which the control devices for the plurality of apparatuses compose a multi-agent system, and the state of each apparatus is controlled according to a control protocol (consensus control, covering control, and distributed optimization control) of the multi-agent system. The apparatus to be controlled and/or managed in the distributed control system may be any apparatus, and may be, for example, an energy source in a distributed energy management system, that is, any machine or apparatus that sends energy through various media or on various carriers (a generator (a synchronous generator, an asynchronous generator, and the like), a solar battery, a windmill (a wind power generator, and the like), a waterwheel (a hydraulic power generator, and the like), a fuel cell, a chemical battery, a storage battery, other power generation apparatuses, a recharger, a charger/discharger, a light emitter, a heater, a cooler, a boiler, an engine, a gas turbine, a steam engine, and the like), a mobile object (a vehicle, an aircraft, a ship, a satellite, and the like), various types of manufacturing machines or processing machines in an industrial plant, and various sensors in a sensor network. Further, the distributed control system may be composed of any apparatus of which the operation is controlled and managed by the IoT technology. In addition, the state to be controlled in the distributed control system may be any measurable physical quantity and/or rate of change or rate of fluctuation thereof, such as output (power), voltage, pressure, temperature, torque, driving force, braking force, electromagnetic force, electromagnetic field, strength, radio field strength, frequency, number of vibration, phase, power factor, time, current, flow rate, flow velocity, volume, charge density, magnetic flux density, enthalpy, energy amount (heat storage amount, charge amount, and the like), position, moving speed, acceleration, rotating speed, operating speed, and rate of change of speed.

2. Description of Related Art

With the development of communication network technology, a technology is proposed and realized in which a plurality of apparatuses, particularly apparatuses located at a distance from each other, are connected to a network system, and the operation or state of the plurality of apparatuses is collectively or remotely controlled and managed through the network system. As one of the systems that control and manage a plurality of apparatuses using such a communication network technology, a distributed control system is used in which apparatuses connected to each other via the network mutually monitor the operation state of each other, and the state of each apparatus is controlled and managed autonomously. As a control protocol of the operation state of each apparatus in such a distributed control system, a control protocol or algorithm of a "multi-agent system" in which each apparatus in the system is controlled by a distributed controller is known, and in relation thereto, various configurations are proposed.

For example, Japanese Unexamined Patent Application Publication No. 2010-146246 proposes a configuration in which, when a plurality of multi-agent systems are independently constructed and operated in one system, an inter-agent communication function can be shared between the multi-agent systems in one terminal computer. Japanese Unexamined Patent Application Publication No. 2009-159808 proposes a distributed power system that includes a plurality of generators and loads, and uses a multi-agent technology in which a section agent arranged in each of sections separated by a section switch in the power system comprehend a tidal current amount in the section, requests a generator agent or a downstream section agent to adjust a tidal current increase/decrease amount, and the generator agent or the downstream section agent autonomously repeats the adjustment in cooperation with other generator agents or downstream section agents, thereby performing a distributed power supply in a section, and a demand-and-supply control in a downstream section. Moreover, Japanese Unexamined Patent Application Publication No. 2016-099955 proposes a configuration in which an information processing device of each user specifies a transmission destination to which division value data indicating a division value based on the maximum power amount and a division value thereof is transmitted, and transmits the division value data, and another information processing device that receives the division value data calculates, from division values, the average value or a standard deviation of the power managed by a plurality of power management devices in order to improve the confidentiality of data on each user while responding to an increase in the number of users who share a statistical value. Further, it has been proposed that a control method of a multi-agent system is effective in controlling the state of an agent, such as a power supply source or an energy source, in a distributed energy management system ("Control of Multi-agent System" in System Control Engineering Series 22, Corona Publishing Co., Ltd. on Sep. 18, 2015, by Shunichi Azuma and five others). In "Average-consensus Problem of Multi-agent Systems with Non-uniform and Asymmetric Time-delays" (Vol. 47, No. 2, 100/109 (2011) in a journal published by The Society of Instrument and Control Engineers, by Kazunori Sakurama and one other), a condition in which a consensus value is obtained in an average consensus problem in multi-agent systems with heterogeneous time-delays in information transfer on a network is analyzed and considered. In addition, in "Average Consensus in Multi-agent Systems with Non-uniform Time-varying Delays and Random Packet Losses" (pages 322 to 326 of paper published at a third IFAC International Conference on Intelligent Control and Automation Science in Chengdu, China, on Sep. 2 to 4, 2013, by Jian Wu, Yang Shi, Bingxian Mu, Huxiong Li, and Wenbai Li), a method of converging the state values of all agents to their consensus value, which is the average value of initial values of the agents, in the average consensus problem in multi-agent systems when the time-delay occurring in information transfer on a network is symmetric has been proposed.

SUMMARY

In a control protocol of a multi-agent system on states of a plurality of apparatuses connected to a communication network in a distributed control system, a state indicator value $x_i$ representing a state of any apparatus, that is, an agent i, is controlled according to the following equation:

$$x_i[k+1]=x_i[k]+Ts \cdot u_i[k] \tag{1}$$

$$u_i[k]=\Sigma_{j \in N_i}{}^n F(x_j[k],x_i[k]) \tag{1a}$$

Here, $x_i[k]$ and $x_i[k+1]$ respectively represent a state indicator value of the agent i at a time k and a target value to be taken by the state indicator value one sampling time after the time k. $x_j[k]$ represents a state indicator value of an agent j, directly connected to the agent i via the communication network, at the time k. $T_s$ represents a sampling period. Moreover, $u_i[k]$ in equation (1a) is referred to as a "distributed controller", and $F(x_j[k], x_i[k])$ is a function of $x_i[k]$, $x_j[k]$. In addition, the above equation is applied to a case of a discrete-time system. In a case of a continuous-time system, an equation obtained by rewriting a differential equation of the state $x_i$ to a differential equation is used. Particularly, when the distributed control is consensus control, the distributed controller $u_i[k]$ is expressed by the following equation:

$$u_i[k] = \sum_{j \in N_i}^{n} a_{ij}(x_j[k] - x_i[k]) \tag{2}$$

$$a_{ij} = \begin{cases} \dfrac{1}{1+\max(|N_i|,|N_j|)} & : j \in N_i \\ 0 & : j \notin N_i \end{cases} \tag{2a}$$

Here, $N_i$ and $N_j$ represent sets of agents directly connected to agents i and j, respectively, $|N_i|$ and $|N_j|$ represent numbers (degrees) of $N_i$ and $N_j$, respectively. When a configuration of the system is an undirected graph in which all agents are connected and the state of each agent in the system is controlled according to the above equation (2), in theory, the state indicator value $x_i$ of each agent converges to an average value of initial values $x_i[0]$ of the state indicator values $x_i$ of the agents as a consensus value (average consensus control) as follows:

$$X^* = \sum_{i=1}^{n} \frac{x_i[0]}{n} \tag{3}$$

It has been found (see Japanese Patent Application No. 2019-010040), in a case of the consensus control or other control (covering control, distributed optimization control) of the multi-agent system described above, based on the research so far, under the assumption of simultaneity between agents (a state in which there is no time delay in signal information transfer on the communication network between agents and each agent can refer to the state indicator value of an adjacent agent in real time (immediately)), the state indicator value $x_i$ of each agent in the calculation according to the above equation (1) stably converges. However, when the condition of the simultaneity between the agents is not satisfied, that is, when there is a time delay in the signal information transfer in the communication network between the agents, the state indicator value $x_i$ does not converge, or even if it converges, the consensus value deviates from an expected consensus value (for example, the value in the equation (3)) or oscillations occur, and as a result, it has been found (see Japanese Patent Application No. 2019-010040) that it is difficult to stably control the state value of each agent in the control protocol of the multi-agent system as it is. Moreover, particularly, in a case of average consensus control, it is observed that when there is a time delay in the signal information transfer on the communication network between the agents, the average value of the state indicator values $x_i$ of all agents is not maintained as an average value of initial values $x_i[0]$ of the state indicator values $x_i$ of the agents, and even if the state indicator values $x_i$ of all agents converge to the consensus value, the consensus value deviates from the average value of the initial values $x_i[0]$ of the state indicator values $x_i$ of all agents (that is, the value in equation (3)).

On the other hand, in a communication network used in an actual distributed control system, it is impossible to avoid an occurrence of delay in the signal information transfer caused by several factors, such as an application delay [a μ-second order] (a delay that occurs when a transmission-side passes a packet to a TCP/IP layer, a delay that occurs when a reception-side receives and processes a packet and returns a response), a serialization delay [μ to m seconds order] (the period from when the first bit of a packet is transmitted to when the last bit is transmitted, which increases as the network bandwidth decreases, a propagation delay (a delay that occurs when a signal propagates a cable medium), a congestion delay (the time required to store an excess packet in a buffer and retransmit the excess packet when the bandwidth of the line is exceeded). Moreover, particularly, in a large network to which many agents are connected, a signal traffic is congested so that a communication delay occurs due to factors, such as a delay in signal transmission via a communication cable, a delay in transmission via a router, a hub, or the like, a collision due to a concentration of communication, and a delay in transmission during multi-hop communication. Therefore, in order to control, by the control protocol of the multi-agent system in an actual distributed control system, the state of each agent as expected, it is necessary to improve the control protocol according to equation (1).

In this regard, the inventors of the present disclosure have already disclosed in Japanese Patent Application No. 2019-010040 as follows: in the state control of each agent, in case in which the distributed controller calculates a changed amount of the state indicator value of its own (own agent), that is, a control input of the distributed controller ($u_i$ in the equation (1)) with reference to the state indicator values of agents (adjacent agents) adjacent to the own agent, when the control device of each apparatus intermittently refers to the state indicator value of the adjacent agents instead of using all of the state indicator values of the adjacent agents sampled in time series, it is possible to compensate for worsening of the state indicator value's convergence to a consensus value, which is caused by time delay in signal information transfer on the communication network between the agents. In addition, in the average consensus control in which it is assumed that two-way time delays between any two agents are equal (that is, the time delays are symmetric), it is possible to match the consensus value to which the state indicating value of each agent converges with the average value of the initial values $x_i[0]$ of the state indicator values $x_i$ of all agents as expected by using the state indicating value of which the sample time matches that of the referred state indicating value of the adjacent agent, as the state indicating value of the own agent in control input of the distributed controller. As such, it is possible to compensate for convergence of the state indicating value to the consensus value and accuracy thereof.

As a result of further research and development by the inventors of the present disclosure, it has been found that in a control protocol of a multi-agent system in a case in which a meaningful time delay occurs in signal information transfer on the communication network between agents, convergence of the state indicator value of each agent to the consensus value or an equilibrium value depends on a length of delay time (transmission time) in transmission of the state indicator values between adjacent agents, and thus the convergence of the state indicator value of each agent can be further improved by adjusting the contribution of the distributed controller to the target value of the state indicator value of each agent between the adjacent agents according to a length of delay time (communication delay time) in transmission of the state indicator value of each agent. Moreover, it has been found that the above effect can be obtained even when the time delay in signal communication between adjacent agents is not symmetric. This finding is used in the present disclosure.

Thus, one aspect of the present disclosure is a distributed control system configured to control or manage a state of each of a plurality of apparatuses connected to each other via a communication network according to a control protocol of a multi-agent system as described above. The present disclosure provides a system configured to control the state of each apparatus using a new control protocol that can compensate for worsening of convergence of the state indicator value of each agent, which is caused by delay in signal communication even when the delay in the signal communication on the communication network is not symmetric (including when the time delay is symmetric).

The distributed control system according to one aspect of the present disclosure includes a plurality of control devices configured to respectively control the states of the plurality of apparatuses and a communication network composed of a plurality of communication lines that connect the plurality of control devices. A state indicator value indicating a selected state is measured in each of the apparatuses, and is transmitted from a control device of a corresponding one of the apparatuses via the communication line to a control device of an apparatus adjacent to the corresponding apparatus, from among the plurality of apparatuses connected to the communication lines. The control device of each of the apparatuses is configured to control the state of an own apparatus from among the plurality of apparatuses, the own apparatus controlling the selected state by oneself, by referring to the state indicator value of the own apparatus and the state indicator value of the adjacent apparatus, such that the state indicator value of the own apparatus matches a state target value that is determined according to the control protocol of a multi-agent system. Each of the control devices includes a state target value determination unit that determines, according to the control protocol, the state target value of the own apparatus, using the current state indicator value of the own apparatus, and a distributed controller input that is a function of the state indicator value of the adjacent apparatus and the state indicator value of the own apparatus. The state target value determination unit is configured to determine a control gain which adjusts contribution of the distributed controller input to the state target value based on at least one of a communication delay time when the state indicator value of the adjacent apparatus is transmitted from the control device of the adjacent apparatus to each of the plurality of control devices and the communication delay time when the state indicator value of the own apparatus is transmitted from each of the plurality of control devices to the control device of the adjacent apparatus.

In the above configuration, the "apparatus" may be any apparatus of which an operation state is controlled, such as an energy source, a mobile object, various pieces of manufacturing machinery, and various sensors, as described in the "Technical Field", the "selected state" of the "apparatus" is any measurable physical quantity and/or a rate of change or rate of fluctuation of the physical quantity, as described in the "Technical Field", and may be an arbitrarily selected state. The "state indicator value" is an actually measured value indicating the selected state, and the "state target value" is a target value of the state to which the state indicator value should match in the state control. The control device may be any form of control device that measures the state indicator value indicating any state of the apparatus and autonomously controls the state, and typically, may appropriately control the state of the apparatus using a computer. The communication line which is connected between the control devices of the apparatuses and transmits a signal indicating the state value of each apparatus may be a line that transmits a signal in any type, such as wired communication, wireless communication, and optical communication. In addition, in the above configuration, "own apparatus" refers to an apparatus of which the state is controlled by its own control device from among the control devices in the system, and the "adjacent apparatus" refers to an apparatus of which the state is controlled by a control device directly connected to the apparatus via the communication line, from among the control devices. (An apparatus of which the state is controlled by another control device further connected via the communication line to a control device connected via the communication line, from among the control devices, refers to the adjacent apparatus of the adjacent apparatus.) The "control protocol of the multi-agent system", as known in this field, may be any protocol that achieves the consensus control for solving a consensus problem in the multi-agent system, the covering control for solving a covering problem, and the distributed optimization control for solving a distributed optimization problem (hereinafter, referred to as "the consensus control, and the like"). Particularly, the consensus control is a form of control that controls the state of each agent such that the state indicator values of all agents (that is, apparatuses) in the system asymptotically match a certain consensus value. In other words, the consensus control controls the state of each agent such that the state indicator values $x_i$, $x_j$ of any agents i, j in the system satisfy the following equation:

$$\lim_{k \to \infty} (x_i[k] - x_j[k]) = 0 \qquad (4)$$

and such that the state indicator value $x_i$ of any agent i converges to a certain constant value $\alpha$, that is, satisfies the following equation:

$$\lim_{k \to \infty} x_i[k] = \alpha \qquad (5)$$

The consensus control to which the present disclosure is applied may be an average consensus control in which the consensus value is the average value of the initial values of the status indicator values of all agents, and a leader and follower consensus control in which the consensus value is the status indicator value of a certain agent in the system, or a consensus control in which the consensus value is a geometric average value, a maximum value, or a minimum value of the initial values of the state indicating values of all agents. Further, when the control protocol is the consensus control, the function of the state indicator value of the adjacent apparatus and the state indicator value of the own apparatus is a difference between the state indicator value of the adjacent apparatus and the state indicator value of the own apparatus. In other control forms, the state of each agent is controlled such that the state indicator value $x_i$ of any agent i converges to a certain equilibrium value (hereinafter, the consensus value and the equilibrium value are referred to as "the consensus value, and the like").

As described above, it has been found by the research so far as follows: in a case in which the control protocol of the above multi-agent system controls the state of each agent by using a differential equation of the above equation (1) as it is, which is generally known for achieving the consensus control, and the like, in theory, when each agent can refer to the state indicating value of the adjacent agent in real time, that is, when there is no time delay when the state indicator value is transmitted from the adjacent agent to each agent via the communication line, the state indicator values of all the agents converge to a certain consensus value, and the like. However, when a meaningful time is required for transmitting the state indicator value between agents via the communication line (when time delay occurs), the state indicator value of each agent does not converge to the consensus value, and the like, or even if it converges, the consensus value deviates, or the like. Therefore, in a distributed control system that uses an actual communication network in which time delay in transmission of the state indicator value via the communication line occurs, an appropriate consensus control, and the like, cannot be achieved by control using the equation (1) as it is. To resolve the above shortcoming, the inventors of the present disclosure have proposed in Japanese Patent Application No. 2019-010040, a configuration for compensating for the influence on the consensus control, which is caused by the delay in the signal communication on the communication network.

The inventors of the present disclosure further searched for a control protocol that can appropriately achieve the consensus control and the like, and particularly a control protocol that can obtain an advantageous effect even when the time delay of the signal communication is not symmetric. As a result, as described above, it has been found that the quality of the convergence of the state indicator value of each agent to the consensus value, and the like, depends on the length of time (the communication delay time) required for communication of the state indicator value between adjacent control devices, and the convergence of the state indicator value of each apparatus can be further improved by adjusting the contribution of the distributed controller to the target value of the state indicator value of each agent according to the length of the communication delay time.

Thus, in the system according to the above aspect of the present disclosure, as described above, the state target value determination unit of the control device of each apparatus determines the state target value of own apparatus of each of the control devices using the current state indicator value of the own apparatus, and the distributed controller input which is a function of the state indicator value of the adjacent apparatus and the state indicator value of the own apparatus. The control gain which adjusts contribution of the distributed controller input to the state target value is determined based on a communication delay time when the state indicator value of the adjacent apparatus is transmitted from the control device of the adjacent apparatus to each control device or a communication delay time when the state indicator value of the own apparatus is transmitted from each control device to the control device of the adjacent apparatus. As such, the convergence of the state indicator value of each agent to the consensus value, and the like, is further improved.

In the system according to the above aspect, the state target value determination unit of each of the plurality of control devices may determine the control gain based on the longer time from among the communication delay time when the state indicator value of the adjacent apparatus is transmitted from the control device of the adjacent apparatus to each of the plurality of control devices and the communication delay time when the state indicator value of the own apparatus is transmitted from each of the plurality of control devices to the control device of the adjacent apparatus. Since the communication delay time (a first communication delay time) when the state indicator value of the adjacent apparatus is transmitted from the control device of the adjacent apparatus to each control device may be different from the communication delay time (a second communication delay time) when the state indicator value of the own apparatus is transmitted from each control device to the control device of the adjacent apparatus when the delay in the signal communication on the communication network is not necessarily symmetric, an influence on the convergence of the state indicator value is larger as the communication delay time is longer. Therefore, in order to curb the influence, the control gain may be determined based on the longer time of the first communication delay time and the second communication delay time.

Further, in the system according to the above aspect, the state target value determination unit of each of the plurality of control devices may reduce the control gain when the communication delay time is long compared to when the communication delay time is short. As the communication delay time between the adjacent apparatuses is longer, the contribution of the function of the state indicator value in the distributed controller of the adjacent apparatus worsens the convergence of the state indicator value. Therefore, in order to reduce the contribution of the function of the state indicator value between the adjacent apparatuses having the long communication delay time, the control gain may be set to be reduced when the communication delay time is long compared to when the communication delay time is short.

Further, in the system according to the above aspect, the state target value determination unit of each of the plurality of control devices may set, when the distributed controller input is the sum of functions of the state indicator values of a plurality of apparatuses adjacent to the own apparatus and the state indicator value of the own apparatus, the control gain for each of functions corresponding to the control devices of the adjacent apparatuses connected to each of the plurality of control devices. The control device of each apparatus may be connected to the control device of at least one adjacent apparatus via the communication network, and the communication delay time is different for each adjacent control device. Therefore, when the distributed controller input is the sum of the functions of the state indicator values of a plurality of adjacent apparatuses and the state indicator value of the own apparatus, the control gain may be determined according to the communication delay time corresponding to each adjacent control device, that is, each function of the state indicator values of the apparatuses adjacent to each other in the distributed controller. In addition, in the case of the average consensus control, at a request for maintaining the average value of the state indicator values of the plurality of apparatuses in the system, the control gains on the functions of the state indicator values of the apparatuses adjacent to each other in each of the distributed controllers of the adjacent apparatuses may be set equal to each other such that the contributions of the difference between the state indicator values in the distributed controllers of the adjacent apparatuses on the state target values of the adjacent apparatuses are equal to each other.

In the above aspect, with the above configuration of the present disclosure, the distributed controller input $u_i$ of the equation (1) may be modified, using the control gain as described above, as follows:

$$u_i[k] = \Sigma_{j \in N_i}{}^n G_{ij} \cdot F(x_j[k_{aj}], x_i[k_{bi}]) \tag{6}$$

Here, $G_{ij}$ is the control gain set for each of functions F corresponding to the control devices of the adjacent apparatuses connected to each control device, and may be a function of $\max(\Delta_{ij}, \Delta_{ji})$ using the communication delay time (the first communication delay time) $\Delta_{ij}$ when the state indicator value of the adjacent apparatus is transmitted from the control device of the adjacent apparatus to each control device and the communication delay time (the second communication delay time) $\Delta_T$ when the state indicator value of the own apparatus is transmitted from each control device to the control device of the adjacent apparatus. $k_{aj}$ is a measurement time of the state indicator value of the adjacent apparatus j, which is referred to in calculation by the distributed controller $u_i$, and $k_{bi}$ is a measurement time of the state indicator value of the own apparatus i, which is referred to in calculation by the distributed controller $u_i$ ($k_{aj}$ and $k_{bi}$ do not have to match the current time k, as to be described below). Moreover, the control gain $G_{ij}$ in the distributed controller $u_i$ may be set to be equal, for example, to the control gain $G_{ji}$ in the corresponding distributed controller $u_j$. In the system according to the above aspect, the control gain $G_{ij}$ set for each of the functions corresponding to the control devices of the adjacent apparatuses connected to each of the plurality of control devices may be given as $G_{ij} = \Gamma^{-\max(\Delta ij, \Delta ji)}$ . . . (7), using an integer F smaller than 1, the communication delay time (the first communication delay time) $\Delta_{ij}$ when the state indicator value of the adjacent apparatus is transmitted from the control device of the adjacent apparatus to each of the plurality of control devices, and the communication delay time (the second communication delay time) $\Delta_{ji}$ when the state indicator value of the own apparatus is transmitted from each of the plurality of control devices to the control device of the adjacent apparatus.

In the above configuration of the present disclosure, when the control gain is determined by the communication delay time of the state indicator value, the control device of each apparatus needs to check when the state indicator value referred to in the determination of the state target value has been measured and when the state indicator value referred to has been received at the control device of the transmission destination. Therefore, the measurement time is given as a measurement time stamp to the measured state indicator value of each apparatus in each control device and transmitted to the control device of the adjacent apparatus together with the state indicator value, and the reception time is given as a reception time stamp to the received state indicator value of each control device, such that the communication delay time that is a difference between the measurement time and the reception time may be transmitted to the control device of a transmission source of the state indicator value and referred to in the determination of the control gain.

Further, in the system according to the above aspect of the present disclosure, each control device may include a transmission unit that transmits the state indicator value of the own apparatus to the control device of the adjacent apparatus. The transmission unit may be configured to transmit the latest state indicator value of the own apparatus after the state indicator value of the own apparatus is transmitted and arrives at the control device of the adjacent apparatus. As proposed in Japanese Patent Application No. 2019-010040, in the multi-agent system, in determination of a change amount per cycle in the state target value of each agent (that is, the distributed controller input), when the control device of each apparatus intermittently refers to the state indicator value of the adjacent agent instead of using all of the state indicator values measured in time series in the adjacent agent, and more specifically, refers to the state indicator value of the adjacent agent leaving out the state indicator values of the adjacent agent measured from when one state indicator value is transmitted from the adjacent agent via the communication line to when it arrives at each agent (that is, the value referred to as the state indicator value of the adjacent agent is the value of each time period between when a signal of the state indicator value is transmitted from the adjacent agent to each agent and when the a notification that the signal is reached is transmitted from each agent to the adjacent agent), the convergence of the state indicator value of each agent to the consensus value, and the like is improved. Therefore, in the system of the present disclosure, as described above, the transmission unit that transmits the state indicator value of the own apparatus of the control device of each apparatus to the control device of the adjacent apparatus transmits the state indicator value of the own apparatus once, stands by the transmitted state indicator value of the own apparatus for reaching the control device of the adjacent apparatus, and transmits the latest state indicator value of the own apparatus, such that the control device of each apparatus may intermittently refer to the state indicator value of the adjacent apparatus. As such, the convergence of the state indicator value of each apparatus to one consensus value, and the like may be improved.

Still further, in the system according to the above aspect of the present disclosure, the function used by the state target value determination unit of each control device may be the function of the latest state indicator value of the adjacent apparatus received from the control device of the adjacent apparatus and the latest state indicator value of the own apparatus received by the control device of the adjacent apparatus. Here, "the latest state indicator value of the adjacent apparatus received from the control device of the adjacent apparatus" is the latest value among the state indicator values that is transmitted from the control device of the adjacent apparatus and received by each control device, not the latest state indicator value sequentially measured in the adjacent apparatus. In other words, the state indicator value of the adjacent apparatus referred to in the distributed controller of the multi-agent system of the present disclosure is the latest value among the state indicator values measured in the adjacent apparatus at a time traced back by the amount of the first communication delay time (the time required for transmission of the state indicator value from the control device of the adjacent apparatus to each control device) from the time when each control device has received the state indicator value. Moreover, "the latest state indicator value of the own apparatus received by the control device of the adjacent apparatus" is the latest value among the state indicator values of the own apparatus that is transmitted from the control device of the own apparatus and actually received by the control device of the adjacent apparatus (which is the transmission source of the state indicator value received by the control device of the own apparatus), not the latest state indicator value sequentially measured in the own apparatus. In other words, the state indicator value of the own apparatus referred to in the distributed controller of the multi-agent system of the present disclosure is the latest value among the state indicator values measured in the own apparatus at a time traced back by the amount of the second communication delay time (the amount of time required for transmission of the state indicator value from the control device of each own apparatus to the control device of the adjacent apparatus) from the time when the control device of the adjacent apparatus receives the state indicator value. With the above-described configuration, as to be described in a "DETAILED DESCRIPTION OF EMBODIMENTS" below, during a control operation, the same state indicator value may be referred to as the state indicator value of the adjacent apparatus and the state indicator value of the own apparatus in the distributed controller of each control device (that is, when the apparatus i and the apparatus j exchange the state indicator values $x_i[k_b]$ and $x_j[k_a]$, $x_i[k_b]$, which is the value of the adjacent apparatus for the apparatus j, is referred to as the value of the own apparatus for the apparatus i, and $x_j[k_a]$, which is the value of the adjacent apparatus for the apparatus i, is referred to as the value of the own apparatus for the apparatus j). Therefore, the average value of the state indicator values of a plurality of apparatuses in the system is maintained, as such it is possible to stabilize the consensus value, and the like, of the state indicator value of each apparatus.

In the above configuration, in response to reception of the state indicator value of the own apparatus transmitted by itself to the control device of the adjacent apparatus, each control device refers to the state indicator value of the own apparatus in the distributed controller. Therefore, each control device may include a state indicator value reception notification unit that notifies the control device of the adjacent apparatus of the transmission source that the control device has received the state indicator value of the adjacent apparatus once it receives the state indicator value of the adjacent apparatus transmitted from the control device of the adjacent apparatus, such that each control device can notice that the state indicator value of the own apparatus transmitted by the control device itself has been received by the control device of the adjacent apparatus. In other words, each control device can transmit, as a reception-side of the state indicator value, a reception notification to the transmission source, using the state indicator value reception notification unit, and thus each control device can notice, as a transmission-side of the state indicator value, that the state indicator value has arrived at a reception-side. As such, the distributed controller refers to the state indicator value same as that received by the control device of the adjacent apparatus. Therefore, the state indicator value of the own apparatus referred to in the distributed controller of the state target value determination unit of each control device may be the latest state indicator value of the own apparatus that receives the notification from the control device of the adjacent apparatus that the state indicator value of the own apparatus has been received by the control device of the adjacent apparatus.

As described above, the transmission unit of the control device of each apparatus may transmit the next (that is, the latest) state indicator value to the control device of the adjacent apparatus in response to the notification from the control device of the adjacent apparatus that the state indicator value of the own apparatus has arrived at the control device of the adjacent apparatus, by including the state indicator value reception notification unit in each control device. In this case, when the transmission unit of the control device of each apparatus does not receive the notification that a signal of the state indicator value of the own apparatus has arrived even after a predetermined time has elapsed from the control device of the adjacent apparatus even after transmitting the state indicator value, the transmission unit may transmit the next state indicator value (time-out processing). Here, the "predetermined time" may be set to any time longer than a time required for transmitting the signal of an assumed state indicator value (the communication delay time). Alternatively, when the communication delay time can be predicted, the transmission unit of the control device of each apparatus may once transmit the state indicator value of the own apparatus, stand by for a time corresponding to the communication delay time, and then transmit the next state indicator value to the control device of the adjacent apparatus.

Further, in the configuration of the above aspect of the present disclosure, the state indicator value of the own apparatus referred to in the distributed controller of each control device is the value received by the control device of the adjacent apparatus. Therefore, as described above, when the transmission unit that transmits the state indicator value of the own apparatus of each control device to the control device of the adjacent apparatus is configured to transmit the latest state indicator value of the own apparatus after the state indicator value of the transmitted state indicator value of the own apparatus arrives at the control device of the adjacent apparatus, for the state indicator value of the own apparatus referred to in the distributed controller of each control device, similar to the state indicator value of the adjacent apparatus, the value intermittently transmitted to the adjacent apparatus from among the state indicator values measured in time series in the own apparatus, instead of all of the state indicator values measured in time series in the own apparatus, is used.

Thus, according to the above aspect of the present disclosure, a configuration is provided in which the state target value of each apparatus is determined by a new control protocol that determines the control gain adjusting the contribution of the distributed controller input to the state target value based on the communication delay time of the state indicator value, in the distributed control system in which each apparatus is connected via the communication network. As described above, in the communication network of the actual distributed control system, an occurrence of the asymmetric time delay caused by various factors is inevitable in signal transmission. With the configuration of the above aspect of the present disclosure, since it is possible to compensate for the influence of such a time delay in transmission of the state indicator value on the control of the multi-agent system, the distributed control system that can appropriately control the state of each apparatus is expected to be more widely distributed.

Further objects and advantageous effects of one aspect of the present disclosure will become apparent from the following description of embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
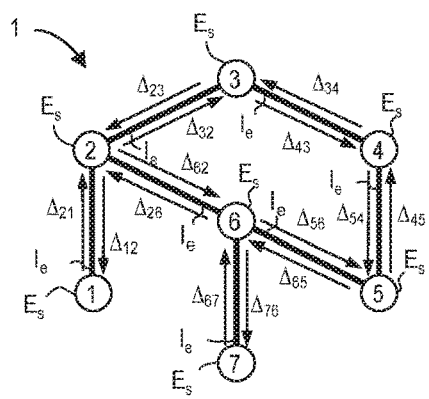
FIG. 1A is a diagram schematically illustrating a configuration of a distributed control system according to an embodiment.

Embodiments of the present disclosure will be described in detail with reference to the drawings hereinafter. In the drawings, the same reference numerals indicate the same parts. In addition, in the following embodiments, a case in which the state indicator value of each agent of a distributed control system is controlled by the average consensus control of a multi-agent system will be described as an example. However, configurations of "an intermittent transmission correction" and "a control gain correction" to be described below are also applied to other control forms, such as consensus control other than average consensus control, covering control, and distributed optimization control, such that convergence of the state indicator value of each agent can be further improved. It should be understood that such cases also fall within the scope of the present disclosure.

With reference to FIG. 1A, in a distributed control system 1 according to the present embodiment, a communication network is formed by control devices $E_s$ (agents) of a plurality of apparatuses connected to each other via a communication line $I_e$. Each agent $E_s$ is configured to acquire a state indicator value indicating a selected state of an apparatus (adjacent apparatus) adjacent to each agent $E_s$ via the communication network. In such a system, the apparatus may be any apparatus of which an operation state is controlled, for example, an energy source, a mobile object, various pieces of manufacturing machinery, various sensors, and the like, as already described in the "Technical Field". Frequently, the selected state of each apparatus is any measurable physical quantity and/or rate of change or rate of fluctuation thereof, as described in the "Technical Field", and the selected state may be an arbitrarily selected state. The communication network may be configured in any type, such as wired communication, wireless communication, and optical communication. According to a control protocol of the multi-agent system, each agent $E_s$ is controlled such that its state indicator value in the system matches a control target value that has been determined using the state indicator values of other agents acquired via the communication network. Particularly, in the examples of FIGS. 1A to 1D, the system is composed of an undirected graph in which all the agents are connected to each other. In this case, when the consensus control is performed as the control protocol, the "average consensus control", in which the consensus value is the average value of initial values of the state indicator values of all the agents, is performed. In the present specification, the average consensus control is performed as the consensus control, as in the illustrated examples. However, the present embodiment may be applied to cases in which leader and follower consensus control or other consensus control is performed depending on a configuration of graphs in the system. It should be understood that such a case also falls within the scope of the present disclosure.

Figure 1B:
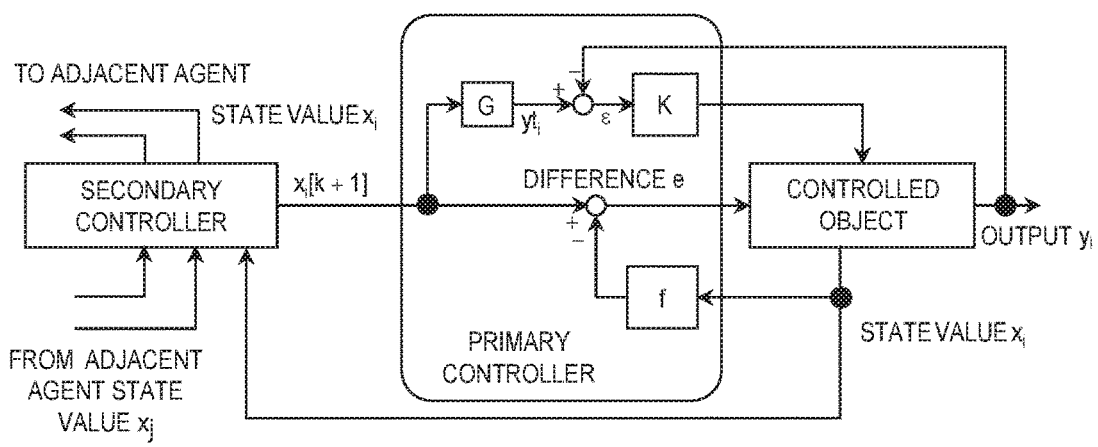
FIG. 1B is a block diagram illustrating a configuration of a control device (agent) of each apparatus in the system according to the embodiment.

In the above system, the control device (i, j, and the like, are numerals of the agents) of each agent i may be typically composed of a primary controller that controls an object to be controlled, that is, a selected state and an output of an apparatus, and a secondary controller that determines a target value of the selected state of the apparatus, as schematically illustrated in FIG. 1B. The control device of each agent may typically be a computer device, and usually is provided with a CPU, a storage device, and an input/output device (I/O) connected to each other via a two-way common bus (not shown) and the operation of each part in the device is performed by executing a program on the CPU. More specifically, the primary controller receives an indicator value (a state indicator value) $x_i[k]$ of a selected state measured in the controlled object and a target value (a state target value) $x_i[k+1]$ of a state transmitted by the secondary controller, and controls the state of the controlled object such that a difference e between the state target value and the state indicator value becomes zero (state feedback control). Alternatively, the primary controller may control an output $y_i$ of the controlled object such that a difference $\varepsilon$ between the output $y_i$ of the controlled object and a target value $yt_i$ of the output of the controlled object, which is determined by using a transmit function G from the state target value received from the secondary controller, becomes zero. Output feedback control and servo control do not have to be required when the output is controlled by the selected state. Moreover, control processing of the state and/or the output in the controlled object may be performed according to the selected state and a type of the output. A detailed type of the control processing may be appropriately determined by those skilled in the art according to the selected state. On the other hand, the secondary controller determines the state target value $x_i$ of its controlled object using the state indicator value $x_i$ of its own controlled object and the state indicator value $x_j$ of the controlled object of an adjacent agent connected via a communication line in a manner to be described below in detail, such that the state indicator value $x_i$ of its own controlled object matches or converges to the consensus value.

Figure 1C:
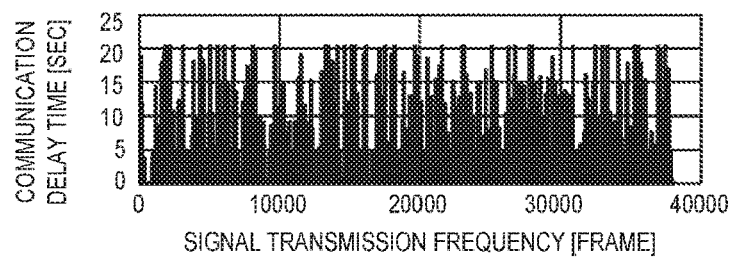
FIG. 1C illustrates an example of a communication delay time observed in a communication network used in an actual distributed control system.
Figure 1D:
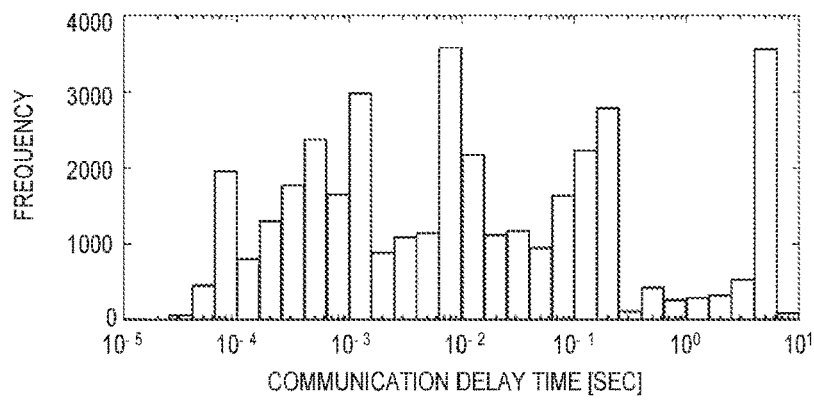
FIG. 1D is a histogram illustrating a frequency for each length of communication delay times that occur between agents of the distributed control system.

In the distributed control system as illustrated in FIG. 1A, as described above, the state indicator value indicating the selected state of each agent is transmitted as a signal to the adjacent agent via the communication line $I_e$. In other words, each agent receives, from the adjacent agent, the signal of the state indicator value thereof via the communication line $I_e$. Regarding the signal communication of the state indicator value between the agents, in an actual communication network, as already described in the "Summary", an occurrence of the delay in the signal communication is inevitable since a finite time is required until the signal of the state indicator value from the adjacent agent arrives at each agent, that is, from the time when the adjacent agent transmits the signal of the state indicator value to the time when each agent receives the signal due to various factors. In addition, generally, the delays in a two-way signal communication between any two agents are not necessarily symmetric, and the time required for signal communication from an agent i to an agent j (a communication delay time $\Delta_{ji}$) does not always match the communication delay time $\Delta_{ij}$, which is the time required for signal communication from the agent j to the agent i. As illustrated in FIGS. 1C and 1D, it is observed that the communication delay time randomly varies in length within a certain range.

However, as described in the "Summary", in arithmetic processing of the control protocol of an existing multi-agent system using a differential equation of the above equation (1), the communication delay time occurring in the communication network is not taken into consideration. In addition, when the differential equation of the above equation (1) is used as it is for control in an environment in which the communication delay time occurs in the communication network, phenomena such as the state indicator value of each agent failing to converge to the consensus value, and the like, an error occurring in the consensus value, and the like, and a fluctuation in the consensus value, and the like are observed. In other words, when the arithmetic processing of the control protocol of the existing multi-agent system is applied as it is to an actual distributed control system as described above, a situation in which stable control cannot be achieved may occur. Therefore, in the present embodiment, as to be described below in detail, the configuration of the secondary controller of the control device of each agent is improved such that the signal communication and the arithmetic processing are performed using a new control protocol that can stably converge the state indicator value of each agent to the consensus value, and the like even in an environment in which the communication delay time occurs in the communication network, especially even when the communication delays between agents are not symmetric.

Arithmetic Processing of Consensus Control in Existing Multi-Agent System

Figure 6A:
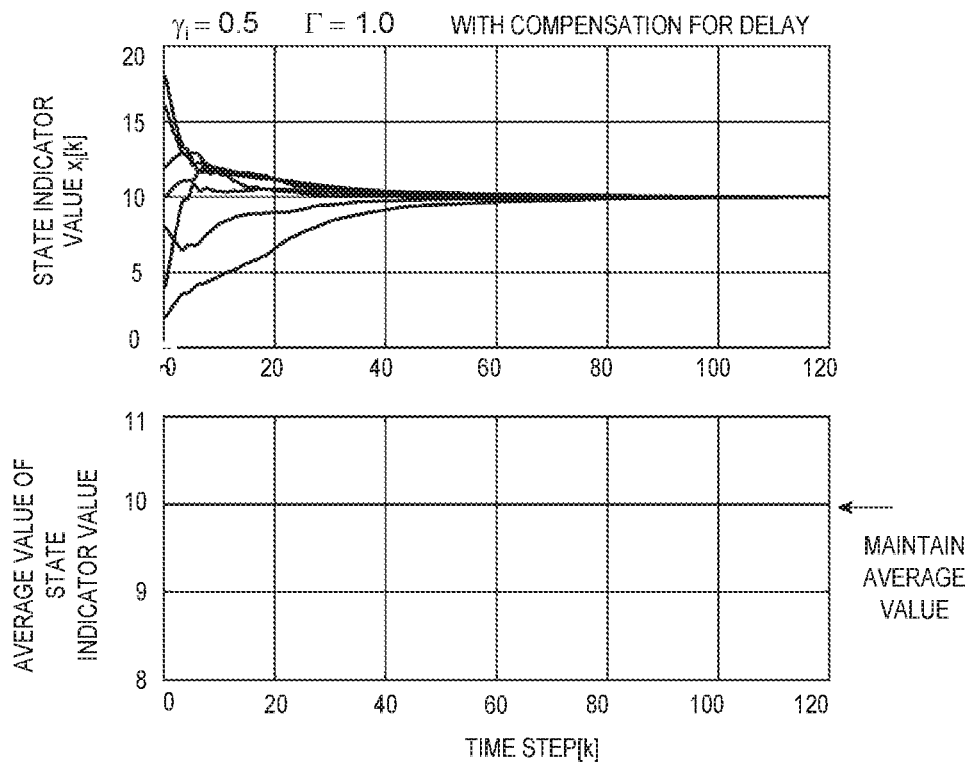
FIG. 6A is a simulation for calculating the time change of the state indicator value of each agent, obtained according to a control protocol (reference correction) that compensates for the communication delay of the state indicator value between agents according to the teachings of the present embodiment in the distributed control system illustrated in FIGS. 1A to 1D, similar to FIGS. 5A and 5B. In this case, the overall control gain $\gamma_i$ of the distributed controller with respect to the state target value is 0.5, and the constant coefficient $\Gamma$, which gives the control gain $G_{ij}$ determined for each adjacent agent is, one (without control gain correction)
Figure 7:
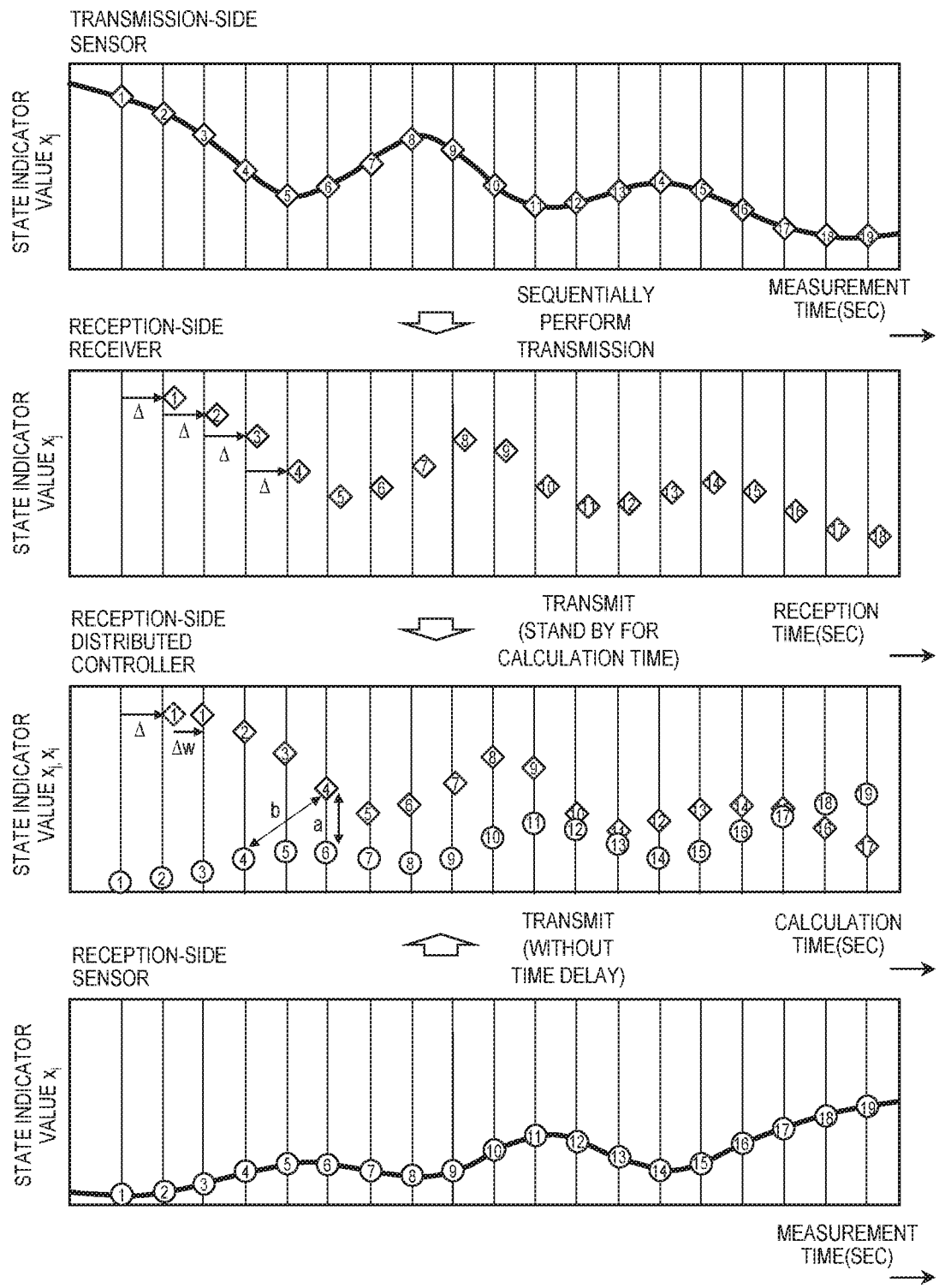
FIG. 7 illustrates time charts describing each timing of measurement of a state indicator value, reception of the state indicator value, and calculation of a state target value in the transmission-side agent (the adjacent apparatus) and the reception-side agent (the own apparatus) when the transmission of the state indicator value is sequentially performed according to the existing control protocol in the distributed control system as illustrated in FIGS. 1A to 1D (intermittent transmission correction). Here it is assumed that a measurement time match a calculation time.
Figure 8A:
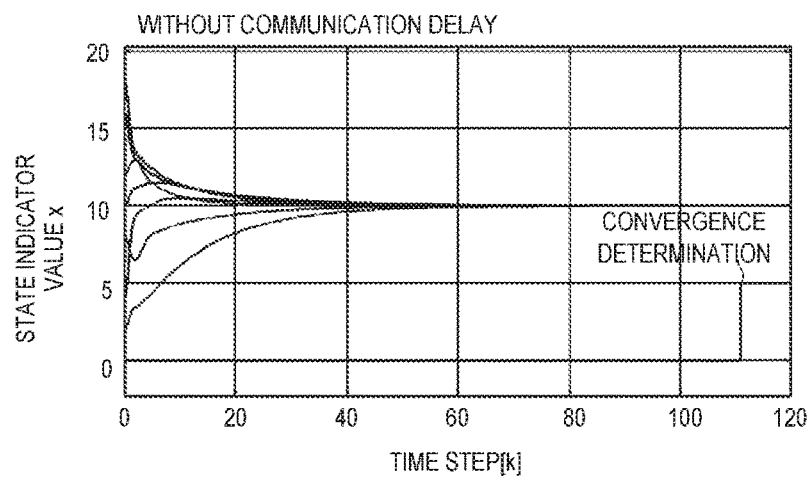
FIG. 8A is a simulation for calculating the time change of the state indicator value of each agent, obtained according to the existing control protocol (without correction) described in FIG. 7, in the distributed control system as illustrated in FIGS. 1A to 1D. It is the calculation simulation in which the measurement time (sampling time) interval is 1.0 second and there is no communication delay time.

Before description of the control configuration according to the present embodiment, a phenomenon that occurs in the existing control configuration will be briefly described. With reference to FIG. 7, in each agent of the system, typically, the state indicator value indicating the selected state of each apparatus (each controlled object) is sequentially measured at every predetermined time interval (a measurement time or a sampling time) which is any time interval that may be set by any sensor, and the measured state indicator values are transmitted to the adjacent agent as a signal via the communication line, for determination of the state indicator value of the apparatus of the adjacent agent. In the consensus control of the multi-agent system, in each agent (the secondary controller), in the case of the existing system, generally, the state target value $x_i[k+1]$ indicating the state to be taken by the own apparatus at a next measurement time is calculated by the equations (1), (2) using the state indicator value $x_i[k]$ measured in the own apparatus and the state indicator value $x_j[k]$ measured in the adjacent agent, and the calculated value is given to an adder for the feedback control of the state of the primary controller. Here, assuming that the state indicator value $x_j[k]$ of the adjacent agent arrives at each agent instantaneously, the state indicator values of all agents in the system converge to the consensus value (in this case, the average value of the initial state indicator values of all agents, as illustrated in equation (3)) by calculating the state target value according to the equations (1), (2). Here, it is assumed that the measurement time and the calculation time of each agent are substantially the same, and the same applies hereinafter. FIG. 8A illustrates an example of a simulation for calculating a time change until the state indicator values of all agents converge to the consensus value. In the actual distributed control system, as described above, since the state target value is calculated by the secondary controller and then servo control of the state of the controlled object is performed by the primary controller such that the state indicator value of the controlled object matches the state target value, the state target value may not match the state indicator value. However, since the time change of the state indicator value of each agent in the drawings (see FIGS. 8A to 8C, FIGS. 5A and 5B, and FIGS. 6A and 6B) attached to the present specification is the calculation simulation, the state indicator values are illustrated as matching the state target values.

However, as described above, since a finite time is required for the signal communication of the state indicator value in the actual communication network, as illustrated in FIG. 7, the time when the signal (◇) of the state indicator value of the agent (the transmission-side agent) of the transmission-side arrives at the receiver of the agent (the reception-side agent) of the reception-side is delayed by the amount of a communication delay time $\Delta$ from the measurement time of the state indicator value. Therefore, when the reception-side agent sequentially calculates the state target value using the latest state indicator value without considering the communication delay, the calculation is performed according to the following equation:

$$x_i[k+1]=x_i[k]+\Sigma_{j\in N_i}{}^n a_{ij}(x_j[k-\delta k]-x_i[k]) \quad (8)$$

Figure 8B:
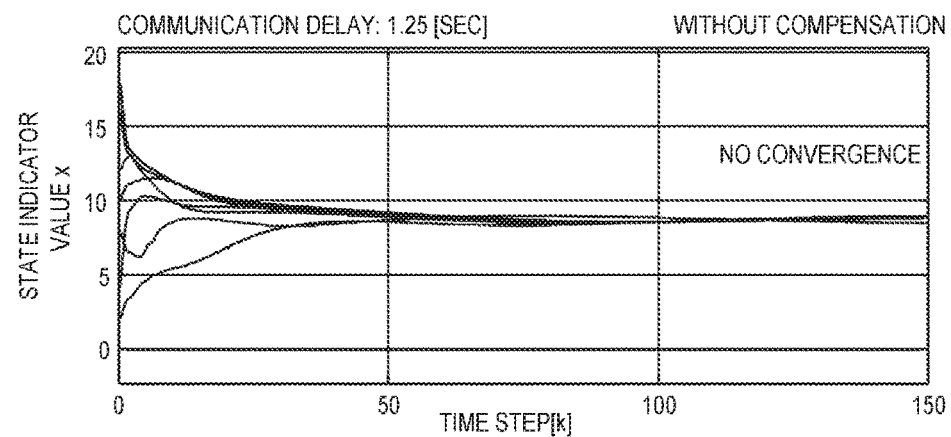
FIG. 8B is a simulation when the measurement time (sampling time) interval is 1.0 second and the communication delay time of 1.25 seconds occurs symmetrically in the signal transmission between the agent 6 and the agents 2, 5, and 7 in FIGS. 1A to 1D, in the calculation simulation in FIG. 8A. The initial values of the state indicator values of the agents are given randomly such that the average value thereof becomes 10. "Convergence determination" indicates a point of time when a difference between the state indicator values of the agents falls within ±0.01%.

Here, $k-\delta k$ is the measurement time immediately before the point in time traced back by the amount of the communication delay time $\Delta$ from the current time k. $\delta k$ is the number of sampling time intervals corresponding to the sum of the communication delay time $\Delta$ and the standby time $\Delta_w$ after reception (see FIG. 7). Then, as represented by an arrow a in FIG. 7, a difference occurs in the measurement time of the state indicator value between the transmission-side agent and the reception-side agent, in the distributed controller (the second term on the right side of the equation (7)). In this case, the state indicator values of all the agents converge to a certain consensus value, phenomena are observed, such as a phenomenon in which when the state target value is calculated, the state indicator values of all the agents converge to a certain consensus value but the consensus value deviates from the expected consensus value (a case in which the communication delay time is not zero but equal to or less than the sampling time interval), a phenomenon in which the state indicator values of all the agents do not converge (a case in which the communication delay time exceeds the sampling time interval, as illustrated in FIG. 8B), or a phenomenon in which the state indicator values of all the agents converge to a certain consensus value, but the consensus value oscillates over time (not shown).

In addition, according to another aspect, in measurement of the state indicator value of each agent, the measurement time of the state indicator value of each agent is simultaneously recorded, and data of the measurement time is transmitted together with the state indicator value to the adjacent agent. In a case in which the state target value is calculated using an equation which is modified such that the measurement time of the state indicator value of the transmission-side agent matches that of the reception agent, in the distributed controller (the second term on the right side of the equation (1)), as represented by an arrow b in FIG. 7, that is, the following equation (a time stamp correction):

$$x_i[k+1]=x_i[k]+\Sigma_{j\in N_i}{}^n a_{ij}(x_j[k-\delta k]-x_i[k-\delta k]) \quad (9)$$

when the communication delay time is equal to or less than the sampling time interval (not zero), the state indicator values of all the agents converge to the expected consensus value, but when the communication delay time slightly exceeds the sampling time interval, it is observed that the state indicator values of all the agents do not even show a tendency to converge (see Japanese Patent Application No. 2019-010040).

Improvement of Arithmetic Processing of Consensus Control of Multi-Agent System (A) Intermittent Transmission Correction As described above, in an environment in which a finite delay time occurs in the signal communication between the agents in the distributed control system, the consensus control might not be able to be stably achieved depending on the condition of the delay of the signal communication in the control protocol using the widely known existing equation (2) (or equations (8) and (9)). Therefore, as described in the "Summary", the inventors of the present disclosure have proposed in Japanese Patent Application No. 2019-010040, regarding processing in which each agent transmits the state indicator value to the adjacent agent, a configuration for improving the convergence of the state indicator value of each agent by changing the control protocol so as to intermittently transmit the state indicator values instead of transmitting all the state indicator values measured in each agent (intermittent transmission correction), as described below.

Figure 2:
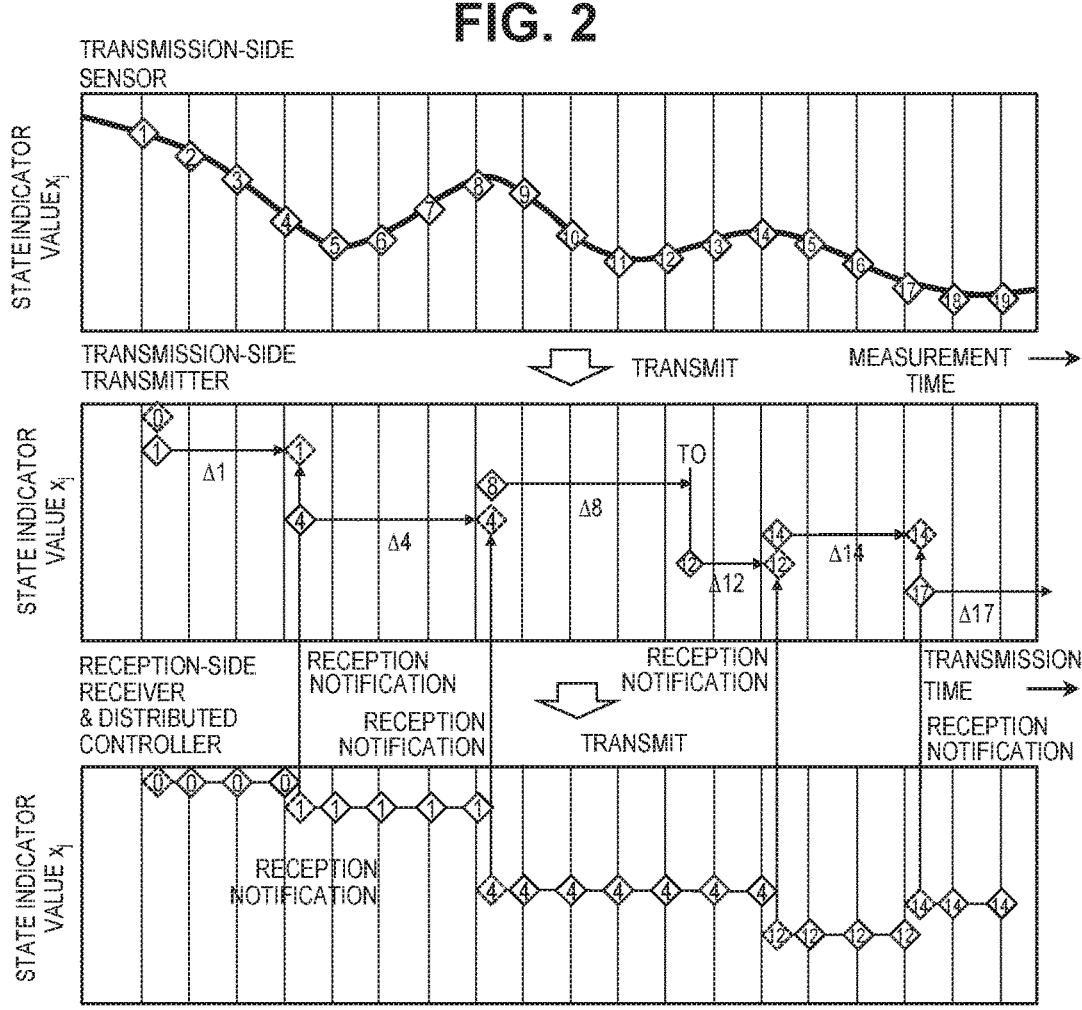
FIG. 2 illustrates time charts describing each timing of measurement of a state indicator value, transmission and reception of the state indicator value, and calculation of a state target value when the state indicator value is intermittently transmitted from each agent (a transmission-side) to its adjacent agent (a reception-side) in the distributed control system as illustrated in FIGS. 1A to 1D (intermittent transmission correction). Here, it is assumed that a measurement time matches a calculation time.

With reference to FIG. 2, specifically, (1) once transmitting, as a transmission-side agent, a state indicator value to the adjacent agent (reception-side agent), each agent stands by transmission processing even when the state indicator value is sequentially measured. When each agent receives, from the adjacent agent of the transmission destination, the notification that the transmitted state indicator value has arrived thereto, the agent transmits the latest measured state indicator value in response to the notification (see FIG. 2). In other words, each agent does not transmit the state indicator values measured after the transmission of the state indicator value until the transmission completion notification is received. In addition, after the transmission of the state indicator value, when the reception notification from the reception-side agent does not arrive even after a predetermined time, which may be set to any time, each agent may transmit the latest measured state indicator value at that point in time (see "TO" in FIG. 2, time-out processing). (2) When receiving, as a reception-side agent, the state indicator value transmitted from the adjacent agent (transmission-side agent), each agent transmits the reception notification to the adjacent agent of the transmission source (see FIG. 2). Since the time required for transmission of the reception notification from the reception-side agent to the transmission-side agent is generally shorter than the time or the sampling time interval required for the communication of the state indicator value, the time width from transmission to reception of the reception notification is omitted from the figure.

As described above, when each agent, as a transmission-side agent, changes the type of transmission of its state indicator value, each agent, as a reception-side agent, uses the latest state indicator value that has arrived from the transmission source as the state indicator value of the adjacent agent in the distributed controller (corresponding to the second term on the right side of the equation (1)) for calculation of the state target value (see FIG. 2). In other words, the equation (1) for calculation of the state target value is modified as follows:

$$x_i[k+1]=x_i[k]+\Sigma_{j\in N_i}{}^n a_{ij}(x_j[k_{aj}]-x_i[k]) \quad (10)$$

Here, $k_{aj}$ is the measurement time of the state indicator value transmitted from the transmission-side agent j, and is expressed as $k_{aj}=l_{aj}-\delta k \ldots (10a)$, $\delta k=\Delta_s+\Delta_{ij}+\Delta_r \ldots (10b)$, using a first measurement time $l_{aj}$ (<k [current time]) after the reception of the state indicator value by the reception-side agent i. Here, $\Delta_s$ is the standby time from the measurement time $k_a$ immediately before the transmission time of the transmission-side agent to the transmission time, and $\Delta_r$ is the standby time from when the state indicator value of the transmission-side agent arrives at the reception-side agent to the calculation time. In addition, $\Delta_{ij}$ is the communication delay time, that is, the time required for signal transmission from the transmission-side agent j to the reception-side agent i. In a configuration in which the reception notification is transmitted from the reception-side agent to the transmission-side agent, $\Delta_{ij}$ may include the time until the reception notification arrives. According to this protocol, once receiving the state indicator value of the transmission-side agent (adjacent agent), the reception-side agent continuously uses the received state indicator value in the distributed controller until receiving the next state indicator value of the transmission-side agent. Moreover, the state indicator value of the adjacent agent used in the distributed controller of each agent may be updated for each adjacent agent. For example, measurement times $k_{aj}$ of the state indicator values of agents 2, 5, and 7 used in the distributed controller of an agent 6 in FIG. 1A may be different.

Figure 8C:
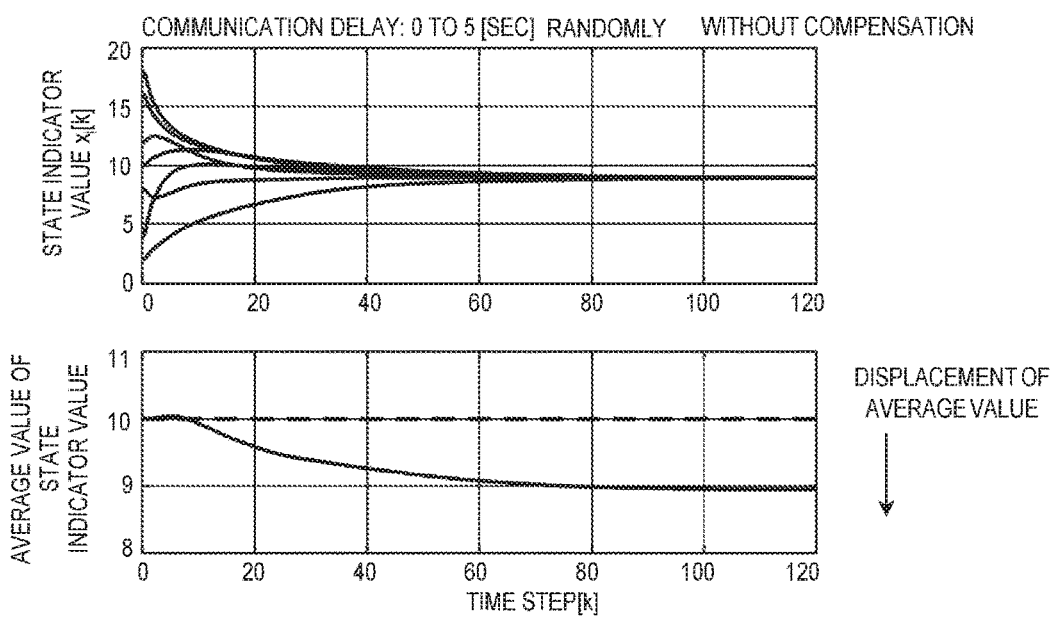
FIG. 8C is a simulation when the communication delay time occurring in transmission of the state indicator value between the agents is set to occur randomly from 0 to 5 seconds, in the calculation simulation illustrated in FIGS. 8A and 8B. Here, each agent is set to transmit the state indicator value after receiving the reception notification of the transmitted state indicator value from the agent which is the transmission destination (after confirming that the transmitted state indicator value has arrived) (intermittent transmission correction). It is assumed that the state indicator value referred to in the distributed controller $u_i$ of each agent is the latest state indicator value of the adjacent apparatus received from the control device of the adjacent apparatus and the latest state indicator value of the own apparatus obtained in the calculation time (without reference correction). Further, in this case, an overall control gain $\gamma_i$ of the distributed controller with respect to the state target value is set to 0.5.

Thus, in a case in which the state target value is calculated by applying the intermittent transmission correction using the above equation (10), as illustrated in the result of the calculation simulation in the upper part of FIG. 8C, in time change of the state indicator values, even when the communication delay time changes randomly within a range exceeding the sampling time interval, it is possible to greatly improve the convergence of the state indicator values of all agents to the consensus value. Further, the example of FIG. 8C is a result obtained by multiplying the second term on the right side of the equation (10), which is the distributed controller input, by the control gain γi=0.5 so as to accelerate the convergence of the state indicator value. However, in the case of the average consensus control, simply by applying the above intermittent transmission correction, as illustrated in the lower part of FIG. 8C, it is not possible to resolve an issue in which the average value of the state indicator values of all agents is changed and the consensus value to which the state indicator values converge does not match an expected value (in this case, initial values of the state indicator values of all agents), that is, an issue of a deviation of the consensus value. Indeed, as disclosed in Japanese Patent Application No. 2019-010040, it is observed that as the communication delay time becomes longer, the deviation of the consensus value and the convergence time also become longer.

(B) Reference Correction

As described above, when the state indicator value is controlled using the above equations (1), (2), or (8) to (10) in an environment in which a finite delay time in signal communication between the agents in the distributed control system occurs, the average value of the state indicator values of all agents which are connected to form the undirected graph, is not maintained. As a result, a phenomenon occurs in which even when the state indicator values converge to the consensus value by applying, for example, the intermittent transmission correction, the consensus value deviates from the expected average value of the initial values of the state indicator values of all agents. On the other hand, when the communication delay time in signal transmission between the agents in the system does not occur, for any two agents i, j, a difference between terms on the two agents in the respective distributed controllers $u_i$, $u_j$ are $(x_j[k]-x_i[k])$, $(x_i[k]-x_j[k])$, respectively. In other words, the state indicator values referred to in the terms are the same $x_i[k]$, $x_j[k]$. In short, since the state indicator value referred to in the distributed controller of each agent in the system is common to that of the adjacent agent, the average value of the state indicator values of all agents is maintained. However, in the existing control protocol of the state indicator value of the agent, when the communication delay time occurs in the signal transmission between the agents in the system, the state indicator value of the own apparatus referred to in the distributed controller of each agent may be different from that transmitted to the adjacent agent. Accordingly, the state indicator value of the own apparatus does not necessarily match the state indicator value of the own apparatus referred to as the state indicator value of an adjacent agent in the distributed controller of the adjacent agent, and as a result, the average value of the state indicator values of all the agents is not maintained. Therefore, according to the present embodiment, the control protocol is modified such that the state indicator value of the own apparatus referred to in the distributed controller of each agent is the same as that transmitted to the adjacent agent. As such, the average value of the state indicator values of all agents can be maintained. Hereinafter, this modification of the control protocol is referred to as a "reference correction".

Theoretically, the distributed controller $u_i$ in the equation (2) is modified as follows:

$$u_i[k]=\Sigma_{j\in N_i}{}^n a_{ij}(x_j[k-\Delta_{ij}[k]]-x_i[k-\Delta_{ji}[k]]) \quad (11)$$

Here, $\Delta_{ij}[k]$ is the communication delay time required for signal transmission from the agent j, which is adjacent to the agent i, to the agent i, and $x_j[k-\Delta_{ij}[k]]$ is the state indicator value of the agent j at a time traced back by the amount of $\Delta_{ij}[k]$ from the current time k, which is received from the agent i, and $\Delta_{ji}[k]$ is the communication delay time required for signal transmission from the agent i to the agent j, and $x_i[k-\Delta_{ji}[k]]$ is the state indicator value of the agent i at a time traced back by the amount of $\Delta_{ji}$ from the current time k, which is received by the agent j. Alternatively, $\Delta_{ij}[k]$ and $\Delta_{ji}[k]$ do not have to be constant but may change every moment.

According to the above equation (11), it is proved that the average value of the state indicator values of all the agents which are connected to form the undirected graph is maintained as below. First, the equation (11) is expressed as follows by performing z-transform:

$$U_i[z] = \sum_{j \in N_i}^{n} a_{ij}\left(\frac{1}{z^{\Delta_{ij}[k]}} Q_j[z] - \frac{1}{z^{\Delta_{ji}[k]}} Q_i[z]\right) \quad (12)$$

Here, $U_i[z]$, $Q_i[z]$, and $Q_j[z]$ are z-transforms of $u_i[k]$, $x_i[k]$, and $x_j[k]$, respectively. Therefore, the distributed controller U of all agents is expressed as $U[z]=-L^d_a[k]Q[z]$ ... (13), using Graph Laplacian $L^d_a[k]$ and the vector $Q[z]$ having z-transforms of the state indicator values of all agents as a component. Here, the Graph Laplacian $L^d_a[k]$ is as follows:

$$L_a^d[k] = \begin{bmatrix} \sum_{j \in N_1} \frac{1}{z^{\Delta_{j1}[k]}} a_{1j} & -\frac{1}{z^{\Delta_{12}[k]}} a_{12} & \cdots & -\frac{1}{z^{\Delta_{1n}[k]}} a_{1n} \\ -\frac{1}{z^{\Delta_{21}[k]}} a_{21} & \sum_{j \in N_2} \frac{1}{z^{\Delta_{j2}[k]}} a_{2j} & \ddots & -\frac{1}{z^{\Delta_{2n}[k]}} a_{2n} \\ \vdots & \ddots & \ddots & \vdots \\ -\frac{1}{z^{\Delta_{n1}[k]}} a_{n1} & -\frac{1}{z^{\Delta_{n2}[k]}} a_{n2} & \cdots & \sum_{j \in N_n} \frac{1}{z^{\Delta_{jn}[k]}} a_{nj} \end{bmatrix} \quad (14)$$

Then, when the Graph Laplacian $L^d_a[k]$ is multiplied by a row vector $1^T_n$ in which all components are one, from the left, $1^T_n L^d_a[k]=0^T$ ... (15) is obtained ($0^T$ is a row vector in which all components are zero). As such, the change in the sum of the state indicator values of all agents can be zero, and the average value of the state indicator values of all agents is maintained.

In the above modification of the control protocol, when the above-described intermittent transmission correction is applied to the state indicator value of each agent, the distributed controller $u_i$ (of a time area) is expressed as follows:

$$u_i[k] = \sum_{j \in N_i}^{n} a_{ij}(x_j[k_{aj}] - x_i[k_{bi}]) \quad (16)$$

-continued $$a_{ij} = \begin{cases} \frac{1}{1 + \max(|N_i|, |N_j|)} & : j \in N_i \\ 0 & : j \notin N_i \end{cases} \quad (16a)$$

Here, $k_{aj}$ is the measurement time of the latest state indicator value transmitted from the adjacent agent j and received by the agent i, and $k_{bi}$ is the measurement time of the latest state indicator value transmitted from the adjacent agent i and received by the agent j. In addition, when the intermittent transmission correction is applied in the reference correction in which the value referred to as the state indicator value of own apparatus in the distributed controller of each agent is set to that transmitted to the adjacent agent, it should be understood that the state indicator value $x_i$ of the own apparatus referred to in the distributed controller $u_i$ of the agent i is also a value intermittently transmitted to and received by the adjacent agent from among the state indicator values measured in time series. Moreover, in this regard, each agent cannot notice whether the state indicator value transmitted to the adjacent agent has arrived at the adjacent agent just by transmitting the state indicator value. Therefore, according to the present embodiment, each agent may use the transmitted state indicator value in the distributed controller after receiving, from the adjacent agent of the transmission destination, the notification that the transmitted state indicator value has arrived at the adjacent agent. In other words, the state indicator value of the own apparatus referred to by each agent in the distributed controller may be the state indicator value of the own apparatus, which is confirmed to have been received by the adjacent agent. In addition, for this purpose, each agent is appropriately configured to, upon receiving the state indicator value from the adjacent agent, notify the adjacent agent of the transmission source of that fact.

In the above reference correction, the respective measurement times of the state indicator value of the own apparatus and the state indicator value of the adjacent apparatus referred to in the distributed controller of each agent do not have to match each other. Therefore, it should be understood that an advantageous effect in which the average value of the state indicator values of all agents in the system is maintained by the reference correction can be achieved even when the time delay of the signal communication between any two agents is not symmetric.

(C) Control Gain Correction

As described above, in an environment in which a finite delay time occurs in the signal communication between the agents in the distributed control system, it is possible to improve the convergence of the state indicator value of each agent to a certain degree, using the intermittent transmission correction. Moreover, as disclosed in Japanese Patent Application No. 2019-010040, when the communication delay time between the agents becomes longer, oscillations occur in the state indicator value due to oscillations of the calculated value by the distributed controller, and it is difficult for the state indicator values to converge. Therefore, it has been found that the convergence of the state indicator value can be further improved by multiplying the distributed controller by a gain $\gamma_i$ ($0<\gamma<1$) as the following equation (17), so as to reduce the contribution of the distributed controller to the target value of the state indicator value:

$$x_i[k+1]=x_i[k]+T_s\cdot\gamma_i\cdot u_i[k] \quad (17)$$

In this regard, as described above, since the oscillations of the calculated value by the distributed controller depends on the length of the communication delay time, in a general system in which the communication delay time may randomly fluctuate between the agents, it is considered that the oscillations of components (for example, for agents i and j, $(x_j[k_{aj}]-x_i[k_{bi}])$ and $(x_i[k_{bi}]-x_j[k_{aj}])$) of the distributed controller, which are associated with agents having a long communication delay time, become larger. Therefore, the convergence of the state indicator value can be further improved using the control gain which is determined based on the communication delay time so as to adjust the contribution of the components of the distributed controller associated with the agents to the state target value according to the length of the communication delay time between the agents.

Specifically, the distributed controller $u_i$ may be modified as follows:

$$u_i[k]=\Sigma_{j\in N_i}{}^n G_{ij}\cdot a_{ij}(x_j[k_{aj}]-x_i[k_{bi}]) \quad (18)$$

Here, $G_{ij}$ is the control gain set for each difference corresponding to the control device of the adjacent apparatus connected to each control device, and it may be given by the following equation:

$$G_{ij}=g(\Delta_{ij},\Delta_{ji}) \quad (19)$$

Here, $g(\Delta_{ij}, \Delta_{ji})$ may be a function of a first communication delay time $\Delta_{ij}$ in the transmission of the state indicator value from the agent j to the agent i and a second communication time $\Delta_{ji}$ in the transmission of the state indicator value from the agent i to the agent j. The communication delay time $\Delta_{ij}$ and the communication delay time $\Delta_{ji}$ are generally time variables as described above. Moreover, as described above, generally, since the longer the communication delay time $\Delta_{ij}$ or the communication delay time $\Delta_{ji}$ is, the larger the oscillations of the components of the distributed controller becomes, function g may be a function of which the size is decreased as the communication delay time $\Delta_{ij}$, or the communication delay time $\Delta_{ji}$ becomes longer, or a monotonically decreasing function. In addition, when the communication delay time between the agents is not symmetric, function g may be determined according to the longer one of the two-way communication delay times, in which case, function g may be a function of $\max(\Delta_{ij}, \Delta_{ji})$. Further, as described in the above description of the reference correction, when there is a request to maintain the average value of the state indicator values of all agents in the system, the contribution of the distributed controller to the state indicator value of the agent i and the contribution of the distributed controller to the state indicator value of the agent j need to be equal to each other. Therefore, the control gain may be set as follows:

$$G_{ij}=G_{ji} \quad (20)$$

Assuming that the above requirement is satisfied, the control gain $G_{ij}$ may be given as, for example, $G_{ij}=\Gamma^{max(\Delta ij, \Delta ji)}$ . . . (21), using an integer $\Gamma$ smaller than 1, the first communication delay time $\Delta_{ij}$, and the second communication delay time $\Delta_{ji}$. Alternatively, the control gain $G_{ij}$ may be $G_{ij}=1/\{c\cdot\max(\Delta_{ij}, \Delta_{ji})\}$ . . . (22). Here, c is a positive coefficient.

In the above configuration, the two-way communication delay time $(\Delta_{ij}, \Delta_{ji})$ between the agents may be acquired in each agent by any method. According to one embodiment, each agent records a measurement time tm at the time of measuring the state indicator value, and transmits the state indicator value to the transmission destination agent together with the measurement time tm. In addition, the reception time tr when the transmission destination agent receives the state indicator value is recorded, and the communication delay time to the transmission destination agent may be calculated by subtracting the measurement time tm from the reception time tr. Here, the calculated communication delay time may be used for determination of the control gain in the agent of the transmission destination. Then, the communication delay time may be transmitted from the agent which receives the state indicator value to each agent which transmits the state indicator value, together with the reception notification of the state indicator value, and may be used for determination of the control gain in each agent.

(D) Communication Sequence

Figure 3:
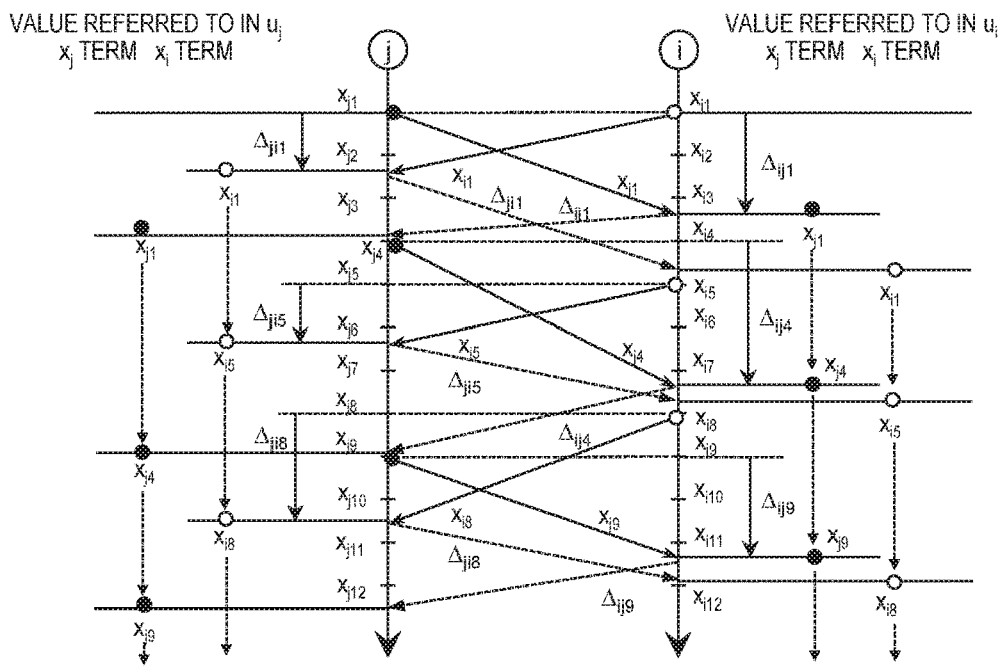
FIG. 3 is a diagram schematically illustrating transmission and reception of state indicator values $x_i$, $x_j$ and communication delay times $\Delta_{ij}$, $\Delta_{ji}$ between agents i, j, which are adjacent to each other, and a sequence (a flow) of values referred to in the state indicator value $x_i$ term, $x_j$ term in the distributed controllers $u_i$, $u_j$, in a distributed control system as illustrated in FIGS. 1A to 1D.
Figure 4:
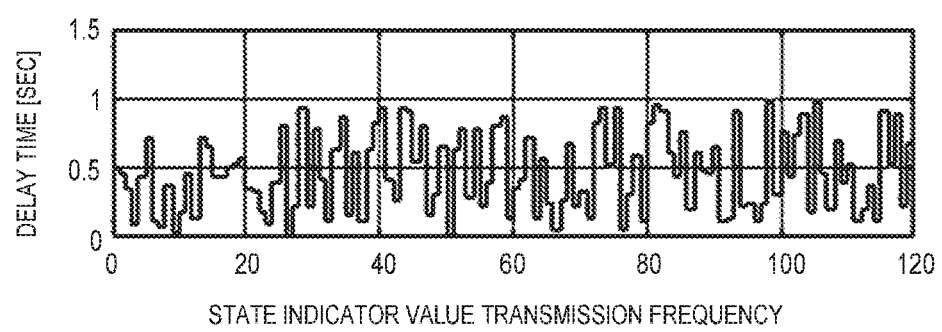
FIG. 4 is an example of the communication delay time, which changes randomly for each transmission and is used in the simulation for calculating the time change of the state indicator value of each agent when the communication delay time changes randomly, in the distribution control system illustrated in FIGS. 1A to 1D.

FIG. 3 illustrates a sequence of measurement, communication, and reference of a state indicator value between any two adjacent agents i, j in the system when the above intermittent transmission correction, reference correction, and control gain correction are applied. In addition, in the illustrated example, the length of time required for signal transmission is schematically represented for the purpose of description, and may be different from the actual length of time.

With reference to FIG. 3, first, it is assumed that state indicator values $x_{ik}$, $x_{jk}$ are measured in time series in agents i, j, respectively (k=1, 2, . . . ). Then, the agents i, j respectively transmit the measured state indicator values $x_{ik}$, $x_{jk}$, together with their measurement times, to the agents j, i. When the transmitted state indicator values $x_{ik}$, $x_{jk}$ are received by the agents j, i, the reception time is recorded in each agent, the measurement times of the corresponding state indicator values $x_{ik}$, $x_{jk}$ are subtracted from the respective reception time, and the communication delay time $\Delta_{jik}$ is calculated in the agent j and the communication delay time $\Delta_{ijk}$ is calculated in the agent i. Moreover, the state indicator value $x_{ik}$ received by the agent j is referred to as the $x_i$ term (the first term of the difference) in the distributed controller $u_j$, and the state indicator value $x_{jk}$ received by the agent i is referred to as the $x_j$ term (the first term of the difference in equation (18)) in the distributed controller $u_i$. Further, the agents j, i that have received the state indicator values $x_{ik}$, $x_{jk}$ transmit the reception notification to the transmission source agents i, j together with the communication delay times $\Delta_{jik}$, $\Delta_{ijk}$. When the agents i, j receive the reception notification, the agents i, j refer to the transmitted state indicator values $x_{ik}$, $x_{jk}$ corresponding to the reception notification as a term of the own state indicator value (the second term of the difference of the equation (18)) in the distributed controller. Subsequently, the agents i, j transmit, to the agents j, i, the latest measured state indicator values $x_{ik}$, $x_{jk}$ (the values may be values measured until the reception notification is received or values measured immediately after the reception notification is received), and repeat the above operation. Thus, the state indicator value referred to in the distributed controller of each agent is the latest value received for the state indicator value of the adjacent agent, and the latest value, of which the reception notification is received after transmission, for the state indicator value of the own agent. In other words, the distributed controller uses the latest value from among the received values until receiving a new value or receiving a new reception notification.

For example, assuming that the state indicator value $x_{j4}$, which are measured at k=4 in agent j and transmitted from the agent j, is received by the agent i after k=7 in the agent i, the state indicator value $x_{j4}$ is referred to as the $x_j$ term of the distributed controller $u_i$ from that point of time, the communication delay time $\Delta_{ij4}$, which is a difference between the measurement time and the reception time of the state indicator value $x_{j4}$, is calculated and used for determination of the control gain $G_{ij}$. Then, the state indicator value $x_{j4}$ and the communication delay time $\Delta_{ij4}$ are used until the next state indicator value arrives from the agent j. Then, the reception notification of the state indicator value $x_{j4}$ together with the communication delay time $\Delta_{ij4}$ is transmitted from the agent i to the agent j, and when the agent j receives the notification, the state indicator value $x_{j4}$ is referred to as the $x_j$ term of the distributed controller $u_j$ of the agent j from that point of time, and the communication delay time $\Delta_{ij4}$ is used for determination of the control gain $G_{ji}$. Subsequently, the latest state indicator value $x_{j9}$ in the agent j is transmitted to the agent i. In the agent j, the state indicator value $x_{j4}$ and the communication delay time $\Delta_{ij4}$ are used in the calculation of the distributed controller until the reception notification of the state indicator value $x_{j9}$ arrives.

(E) Calculation Simulation

In the system illustrated in FIGS. 1A to 1D, an advantageous effect of the above reference correction and control gain correction has been confirmed by the calculation simulation (see FIGS. 5A to 6B). In the calculation, the initial value is given to each agent, the intermittent transmission correction is applied in transmission of the state indicator value between the agents, the reference correction is applied in the calculation of the distributed controller, and the state indicator value of each agent is calculated using the equation (17) according to the control protocol in which the control gain of the distributed controller is appropriately set in the calculation of the target value of the state indicator value. Further, the communication delay time between the agents is given randomly within the range of 0 to 5 seconds in two ways. The distribution controller of each agent is calculated by the equation (18) obtained by applying the control gain $G_{ij}$ to the equation (16). The control gain $G_{ij}$ is calculated by equation (21).

Figure 5A:
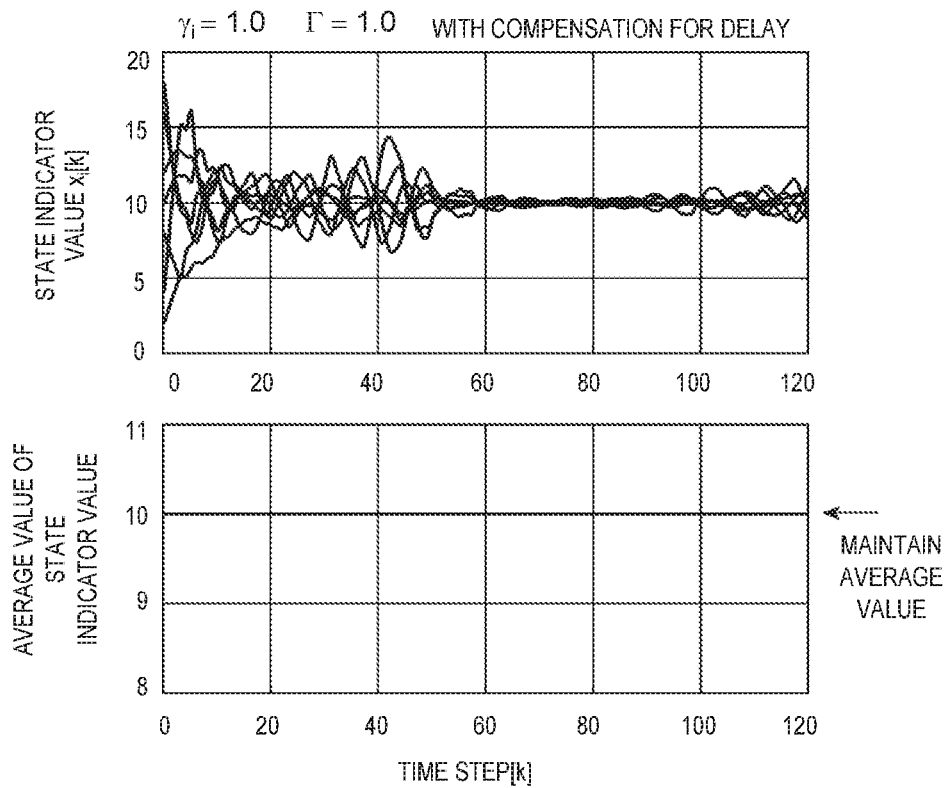
FIG. 5A is a simulation for calculating the time change of the state indicator value of each agent, obtained according to a control protocol (reference correction) that compensates for the communication delay of the state indicator value between agents according to the teachings of the present embodiment in the distributed control system illustrated in FIGS. 1A to 1D. In the calculation simulation illustrated in the figure, it is assumed that the initial values of the state indicator values of the agents are randomly given such that the average value thereof becomes 10, and a measurement (sampling) cycle and an operation cycle of the state indicator value of each agent are 1 second (one step). Here, the measurement time is assumed to match the calculation time. The communication delay time occurring in transmission of the state indicator value between the agents is set to occur randomly from 0 to 5 seconds. In addition, each agent is set to transmit the next state indicator value after receiving the reception notification of the transmitted state indicator value from the agent which is the transmission destination (after confirming that the transmitted state indicator value has arrived) (intermittent transmission correction). It is assumed that the state indicator value referred to in the distributed controller $u_i$ of each agent is the latest state indicator value of the adjacent apparatus received from the control device of the adjacent apparatus and the latest state indicator value of the own apparatus received by the control device of the adjacent apparatus. In this case, an overall control gain $\gamma_i$ of the distributed controller with respect to the state target value is one, and a constant coefficient $\Gamma$, which gives control gain $G_{ij}$ determined for each adjacent agent, is one.
Figure 5B:
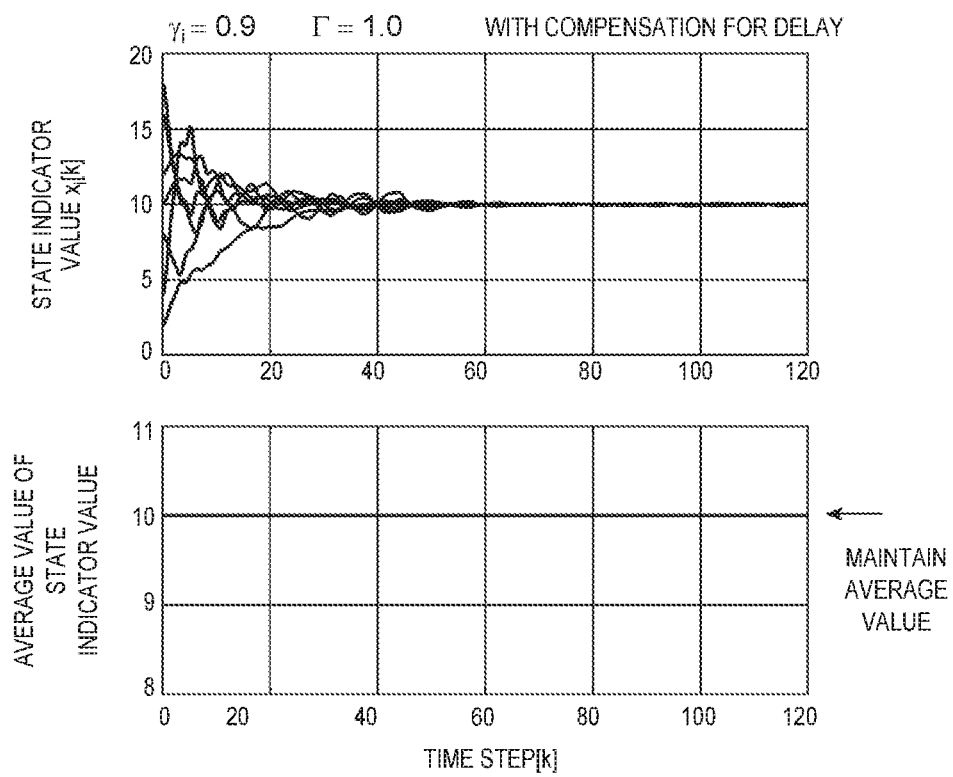
FIG. 5B is a simulation when the overall control gain $\gamma_i$ of the distributed controller with respect to the state target value of each agent is 0.9, and the constant coefficient $\Gamma$, which gives the control gain $G_{ij}$ determined for each adjacent agent, is one, in the calculation simulation of FIG. 5A.

First, FIG. 5A illustrates an example in which the intermittent transmission correction and the reference correction are applied. In this example, since γi=1.0, Γ=1.0 are set, the control gain correction is not applied. As can be understood from FIG. 5A, the state indicator value of each agent changes in a convergent direction, but a convergence condition (in which a difference between the state indicator values of each agent falls within ±0.01%) is not achieved within the test time (120 seconds: 120 steps). However, as illustrated in the lower part of FIG. 5A, since the reference correction is applied, it is confirmed that the average value of the state indicator values of the agents is maintained during the calculation. FIGS. 5B and 6A illustrate examples in which the intermittent transmission correction and the reference correction are applied, and further, the gains γi for reducing the contribution of the entire distributed controller are reduced to 0.9 and 0.5, respectively. With reference to FIGS. 5B and 6A, since the reference correction is applied to FIGS. 5B and 6A, it is confirmed that the average value of the state indicator values of the agents is maintained during the calculation, and the state indicator value of each agent changes in a more convergent direction, compared to the example of FIG. 5A. Moreover, in the example of FIG. 5B, the convergence condition is not achieved within the test time (120 seconds), but in the example of FIG. 6A, the convergence condition is achieved in about 100 seconds.

Figure 6B:
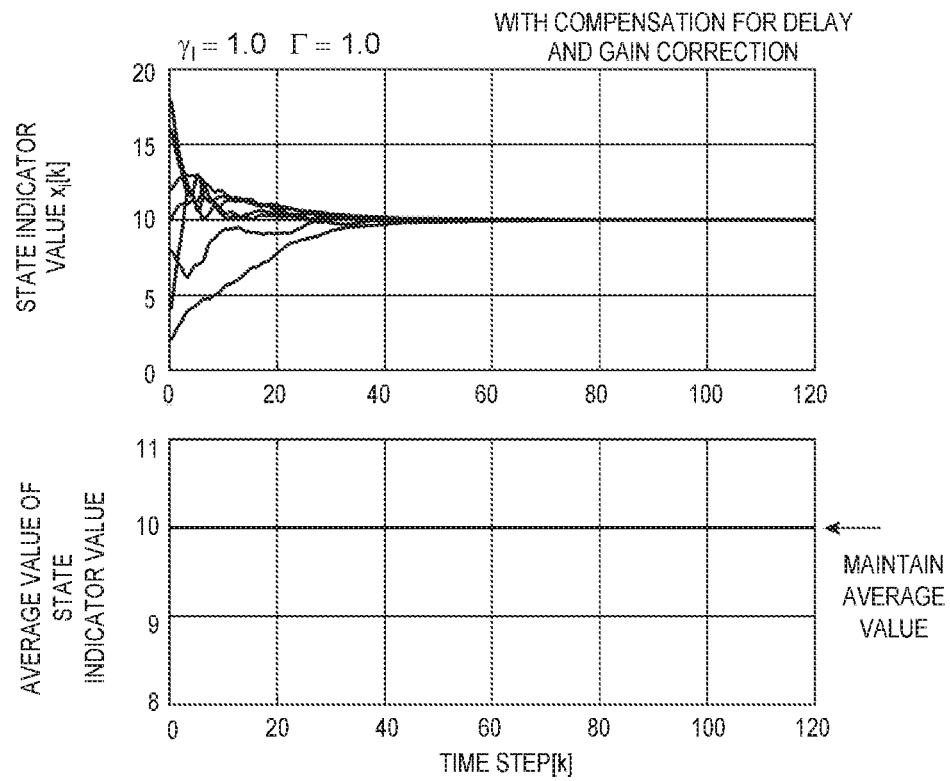
FIG. 6B is a simulation when the overall control gain $\gamma_i$ of the distributed controller with respect to the state target value of each agent is 1.0, and the constant coefficient $F$, which gives the control gain $G_{ij}$ determined for each adjacent agent, is 0.9 (with the control gain correction), in the calculation simulation of FIG. 6A.

On the other hand, in the example of FIG. 6B, the gain γ for reducing the contribution of the entire distributed controller is returned to 1.0, Γ is set to 0.9, and the control gain correction for applying the control gain for reducing the contribution of the corresponding component associated with the agent in the distributed controller is performed according to the communication delay time between the agents. In this case, as can be understood from FIG. 6B, the average value of the state indicator values of the agents is maintained, and the state indicator value of each agent changes quickly in a more convergent direction compared to FIGS. 5B and 6A. In the example of FIG. 6B, the convergence condition is achieved in about 50 seconds. As illustrated in FIG. 6B, the state indicator value of each agent converges earlier when the control gain is applied according to the communication delay time between the agents compared to when the gain of the entire distributed controller is adjusted. The reason for this is considered that the state indicator value of the agent associated with components with the short communication delay time can relatively quickly approach the consensus value by making the contribution of components having a long communication delay time relatively smaller and making the contribution of components having a short communication delay time relatively larger.

From the results of the above calculation simulation, it is confirmed that the average value of the state indicator values of the agents is maintained by the control protocol to which the above reference correction is applied and the state indicator value of each agent can converge to the expected consensus value. In addition, it is confirmed that the convergence of the state indicator value of each agent can be accelerated by performing the correction for applying the control gain determined according to the communication delay time between the agents. Further, it should be understood that the above advantageous effect is achieved even when the delay in signal transmission between the agents is not symmetric.

In addition, the above control gain correction is not limited to the illustrated average consensus control, but may be also applied when a communication delay time occurs in other control forms, for example, consensus control, covering control, and distributed optimization control. Further, it should be understood that the effect of compensating for a worsening of the convergence of the state indicator value of each agent caused by the communication delay time can be obtained.

Although the above description has been made related to the embodiments of the present disclosure, many modifications and changes can be easily made by those skilled in the art. It will be clear that the present disclosure is not limited only to the above-exemplified embodiments, but can be applied to various devices without departing from the concept of the disclosure.

What is claimed is:

1. A distributed control system comprising:
   a plurality of controllers configured to respectively control states of a plurality of apparatuses; and
   a communication network composed of a plurality of communication lines that connect the plurality of controllers, wherein:
   a state indicator value indicating a selected state is measured in each of the apparatuses, and is transmitted from a controller of a corresponding one of the apparatuses via the communication lines to a controller of an apparatus adjacent to the corresponding apparatus, from among the plurality of apparatuses connected to the communication lines;
   the controller of each of the apparatuses is configured to control the state of an own apparatus from among the plurality of apparatuses by referring to the state indicator value of the own apparatus and the state indicator value of the adjacent apparatus, such that the state indicator value of the own apparatus matches a state target value that is determined according to a control protocol of a multi-agent system, the own apparatus controlling the selected state by oneself;

each of the plurality of controllers determines, according to the control protocol, the state target value of the own apparatus, using a current state indicator value of the own apparatus, and a distributed controller input that is a function of the state indicator value of the adjacent apparatus and the state indicator value of the own apparatus;

each of the plurality of controllers is configured to determine a control gain which adjusts contribution of the distributed controller input to the state target value based on at least one of a communication delay time when the state indicator value of the adjacent apparatus is transmitted from the controller of the adjacent apparatus to each of the plurality of controllers and the communication delay time when the state indicator value of the own apparatus is transmitted from each of the plurality of controllers to the controller of the adjacent apparatus;

each of the plurality of controllers is configured to set, when the distributed controller input is a sum of functions of the state indicator values of a plurality of apparatuses adjacent to the own apparatus and the state indicator value of the own apparatus, the control gain for each of functions corresponding to the controllers of the adjacent apparatuses connected to each of the plurality of controllers; and the control gain set for each of the functions corresponding to the controllers of the adjacent apparatuses connected to each of the plurality of controllers is indicated as $G_{ij}$, $G_{ij}$ is given as $G_{ij}=\Gamma^{max(\Delta ij, \Delta ji)}$, where an integer $\Gamma$ smaller than 1, the communication delay time $\Delta_{ij}$ when the state indicator value of the adjacent apparatus is transmitted from the controller of the adjacent apparatus to each of the plurality of controllers, and the communication delay time $\Delta_{ji}$ when the state indicator value of the own apparatus is transmitted from each of the plurality of controllers to the controller of the adjacent apparatus.

2. The system according to claim 1, wherein each of the plurality of controllers is configured to determine the control gain based on a longer time from among the communication delay time when the state indicator value of the adjacent apparatus is transmitted from the controller of the adjacent apparatus to each of the plurality of controllers and the communication delay time when the state indicator value of the own apparatus is transmitted from each of the plurality of controllers to the controller of the adjacent apparatus.

3. The system according to claim 1, wherein each of the plurality of controllers is configured to reduce the control gain when the communication delay time is a longer delay time compared to when the communication delay time is a shorter delay time, wherein the longer delay time is longer than the shorter delay time.

4. The system according to claim 1, wherein:
each of the plurality of controllers transmits the state indicator value of the own apparatus to the controller of the adjacent apparatus;
the controller is configured to transmit a latest state indicator value of the own apparatus after the state indicator value of the own apparatus is transmitted and arrives at the controller of the adjacent apparatus; and
the function used by each of the plurality of controllers is a function of the latest state indicator value of the adjacent apparatus received from the controller of the adjacent apparatus and the latest state indicator value of the own apparatus received by the controller of the adjacent apparatus.

* * * * *